(12) United States Patent
Atsumi et al.

(10) Patent No.: US 7,916,756 B2
(45) Date of Patent: Mar. 29, 2011

(54) TRANSMISSION APPARATUS

(75) Inventors: Toshiyuki Atsumi, Yokohama (JP); Eita Miyasaka, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 611 days.

(21) Appl. No.: 11/488,027

(22) Filed: Jul. 18, 2006

(65) Prior Publication Data

US 2007/0116055 A1 May 24, 2007

(30) Foreign Application Priority Data

Oct. 14, 2005 (JP) ................................. 2005-299555

(51) Int. Cl.
*H04J 3/06* (2006.01)
(52) U.S. Cl. .................... 370/503; 370/476; 370/535
(58) Field of Classification Search .................. 370/535, 370/538, 542, 543, 536, 476, 503, 324, 350
See application file for complete search history.

(56) References Cited

U.S. PATENT DOCUMENTS

| | | | | | |
|---|---|---|---|---|---|
| 4,689,784 | A | * | 8/1987 | Whitesel | 370/542 |
| 4,821,227 | A | * | 4/1989 | Naito | 714/7 |
| 5,548,623 | A | * | 8/1996 | Casper et al. | 375/358 |
| 6,219,357 | B1 | * | 4/2001 | Ishikawa | 370/535 |
| 7,496,043 | B1 | * | 2/2009 | Leong et al. | 370/241 |
| 2002/0021720 | A1 | | 2/2002 | Seto et al. | |
| 2004/0105456 | A1 | * | 6/2004 | Lanzone et al. | 370/429 |
| 2004/0202205 | A1 | * | 10/2004 | Sheth et al. | 370/539 |
| 2005/0063310 | A1 | * | 3/2005 | Caldwell et al. | 370/241 |
| 2006/0023735 | A1 | * | 2/2006 | Sasson | 370/445 |
| 2006/0155843 | A1 | * | 7/2006 | Glass et al. | 709/224 |

FOREIGN PATENT DOCUMENTS

JP 2001-333037 11/2001
JP 2003-032259 1/2003

OTHER PUBLICATIONS

ITU-T Recommendation X.86/Y.1323, Feb. 2001, pp. 1-11.
ITU-T Recommendation G. 7041/Y.1303, Dec. 2003, pp. 1-48.
W. Simpson, Network Working Group, Jul. 1994, pp. 1/22-22/22.
Local and Metropolitan area networks, IEEE Sdt 802.3, 2000, pp. 38-43,965-978, 1009-1028.

* cited by examiner

*Primary Examiner* — Derrick W Ferris
*Assistant Examiner* — Peter Cheng
(74) *Attorney, Agent, or Firm* — Antonelli, Terry, Stout & Kraus, LLP.

(57) ABSTRACT

A transmission apparatus is disclosed, which performs positive/negative stuffing with 8-bit/10-bit (8B/10B) codes being kept intact while retaining the normality of 8B/10B codes and the continuity of running disparity (RD) without termination of 8B/10B codes of a plurality of Gigabit Ethernet (GbE) signals received. The apparatus then executes multiplexing and separation after synchronization of the plurality of signals, thereby achieving the "transparent" transport of management information which is contained in the 8B10B codes between user devices.

13 Claims, 23 Drawing Sheets

FIG. 1

| | BEFORE CONVERSION (8-bit) | | AFTER CONVERSION (10-bit) | |
|---|---|---|---|---|
| CODE GROUP | OCTET VALUE | 8-BIT DATA | Current RD −<br>abcd ei fgh j | Current RD +<br>abcd ei fgh j |
| D0.0 | 00 | 000 00000 | 100111 0100 | 011000 1011 |
| D1.0 | 01 | 000 00001 | 011101 0100 | 100010 1011 |
| D2.0 | 02 | 000 00010 | 101101 0100 | 010010 1011 |
| D3.0 | 03 | 000 00011 | 110001 1011 | 110001 0100 |
| D4.0 | 04 | 000 00100 | 110101 0100 | 001010 1011 |
| D5.0 | 05 | 000 00101 | 101001 1011 | 101001 0100 |
| D6.0 | 06 | 000 00110 | 011001 1011 | 011001 0100 |
| D7.0 | 07 | 000 00111 | 111000 1011 | 000111 0100 |
| D8.0 | 08 | 000 01000 | 111001 0100 | 000110 1011 |
| D9.0 | 09 | 000 01001 | 100101 1011 | 100101 0100 |
| D10.0 | 0A | 000 01010 | 010101 1011 | 010101 0100 |
| ⋮ | ⋮ | ⋮ | ⋮ | ⋮ |

FIG. 2

| CODE | ORDERED SET | CODE GROUP NO. | CODE |
|---|---|---|---|
| /C1/ | CONFIGURATION 1 | 4 | /K28.5/D21.5/Config_Reg(*1) |
| /C2/ | CONFIGURATION 2 | 4 | /K28.5/D2.2/Config_Reg(*1) |
| /I1/ | IDLE 1 | 2 | /K28.5/D5.6/ |
| /I2/ | IDLE 2 | 2 | /K28.5/D16.2/ |
| /R/ | CARRIER EXPANSION | 1 | /K23.7/ |
| /S/ | PACKET HEAD | 1 | /K27.7/ |
| /T/ | PACKET FINISHED | 1 | /K29.7/ |
| /V/ | ERROR TRANSFER | 1 | /K30.7/ |

(*1) CONFIG_REG CONSISTS OF 2 CODES (16-bit) OF /DA.B/DC.D/.

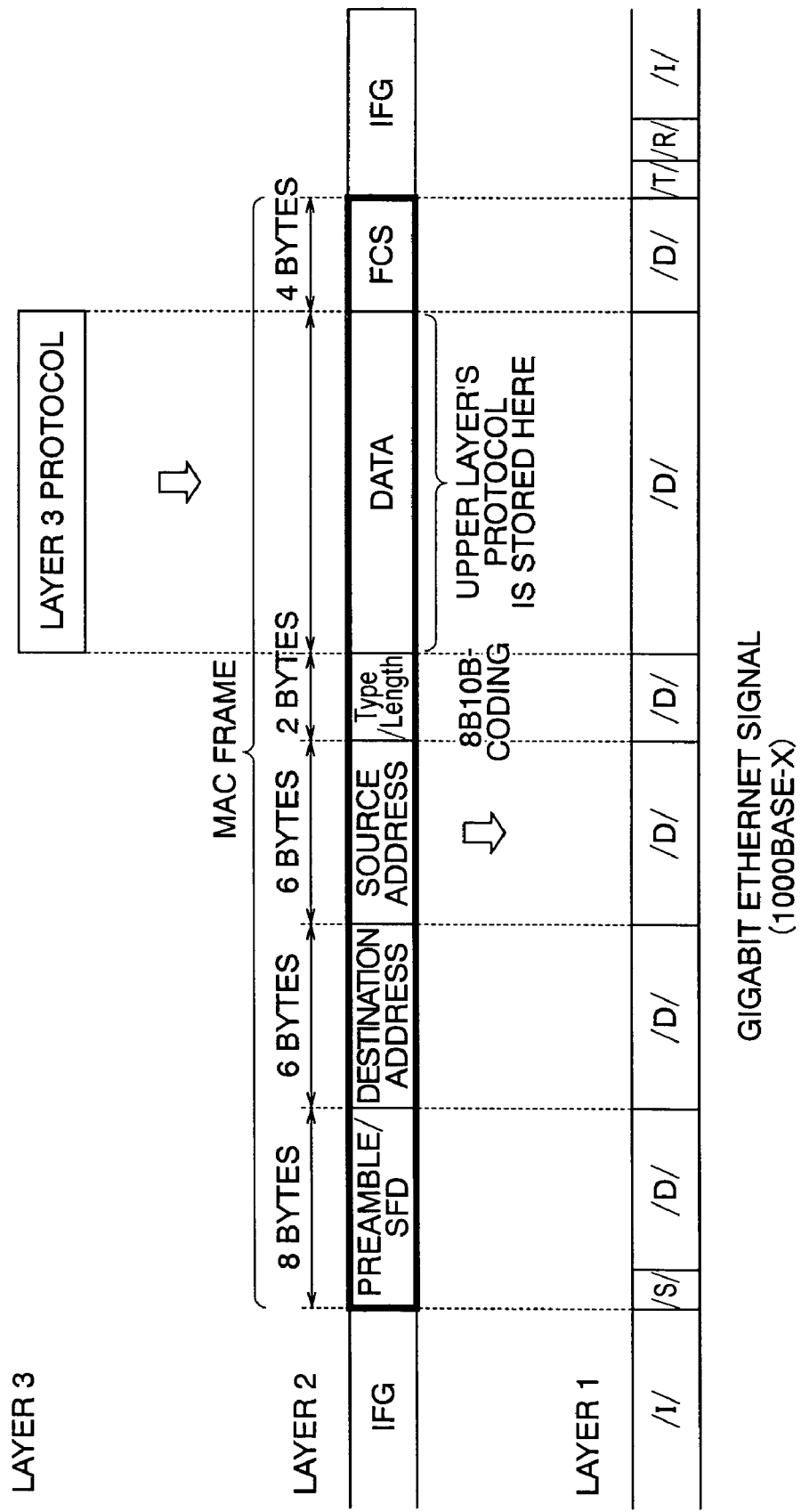

FIG. 12

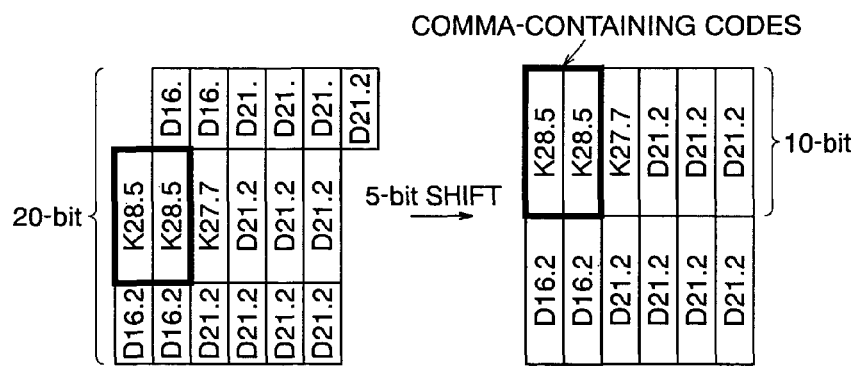

COMMA-CONTAINING CODES

FIG. 13

| ORDERED_SET | /I1/ | | | | /I2/ | | | |
|---|---|---|---|---|---|---|---|---|
| CODE | K28.5(+) | | D5.6(−) | | K28.5(−) | | D16.2(+) | |
| DATA | 110000 | 0101 | 101001 | 0110 | 001111 | 1010 | 100100 | 0101 |
| RD VALUE | + | − | − | − | − | − | − | − | − | + | + | + | + | − | − | − |
| RD VALUE INVERSION | YES | | | | NO | | | |

FIG. 14

DATA FLOW ⟶

| | | /C1/ | | /C2/ | | /C1/ | | /C2/ | | /C1/ | | /C2/ | | /C1/ | | /C2/ | | /C1/ | |
|---|---|---|---|---|---|---|---|---|---|---|---|---|---|---|---|---|---|---|---|
| ① | /C1/: NON-INVERT /C2/: INVERT | + | + | + | − | − | − | − | + | + | + | + | − | − | − | − | + | + | + |
| ② | /C1/: INVERT /C2/: NON-INVERT | + | − | − | + | + | + | + | + | + | − | − | + | + | + | + | + | + | − |
| ③ | /C1/: NON-INVERT /C2/: INVERT | − | − | − | + | + | + | + | − | − | − | − | + | + | + | + | − | − | − |
| ④ | /C1/: INVERT /C2/: NON-INVERT | − | + | + | − | − | − | − | + | − | + | + | − | − | − | − | + | − | + |

LETTING /C1/C2/C1/C2/ BE A BLOCK, RD VALUE IS KEPT NONINVERTED AT THE BEGINNING AND END OF THE BLOCK.

DATA STREAM AFTER POSITIVE STUFF (b) DATA STREAM (READ DATA) AFTER NEGATIVE STUFF

FIG. 21

| | | ORDERED_SET | | | | PORT IDENTIFIER (EXAMPLE) | | | |
|---|---|---|---|---|---|---|---|---|---|
| /I1/ | CODE | K28.5(+) | | D5.6(−) | | K28.5(+) | | D3.2(−) | |
| | DATA | 110000 | 0101 | 101001 | 0110 | 110000 | 0101 | 110001 | 0101 |
| | RD VALUE | − | + | − | − | − | + | − | − |
| | CHANGE OF RD VALUE | +→− | | −→− | | +→− | | −→− | |
| /I2/ | CODE | K28.5(−) | | D16.2(+) | | K28.5(−) | | D0.2(+) | |
| | DATA | 001111 | 1010 | 100100 | 0101 | 001111 | 1010 | 011000 | 0101 |
| | RD VALUE | − | + | + | + | − | + | + | − |
| | CHANGE OF RD VALUE | −→+ | | +→+ | | −→+ | | +→− | |
| /C1/ | CODE | K28.5(+) | | D21.5(−) | | K28.5(+) | | D6.3(−) | |
| | DATA | 110000 | 0101 | 101010 | 1010 | 110000 | 0101 | 011001 | 1100 |
| | RD VALUE | − | + | − | − | − | + | − | − |
| | CHANGE OF RD VALUE | +→− | | −→− | | +→− | | −→− | |
| /C1/ | CODE | K28.5(−) | | D21.5(+) | | K28.5(−) | | D18.3(+) | |
| | DATA | 001111 | 1010 | 101010 | 1010 | 001111 | 1010 | 010011 | 0011 |
| | RD VALUE | − | + | + | + | − | + | + | + |
| | CHANGE OF RD VALUE | −→+ | | +→+ | | −→+ | | +→+ | |
| /C2/ | CODE | K28.5(+) | | D2.2(−) | | K28.5(+) | | D27.5(−) | |
| | DATA | 110000 | 0101 | 101101 | 0101 | 110000 | 0101 | 110110 | 1010 |
| | RD VALUE | − | + | + | + | − | + | + | − |
| | CHANGE OF RD VALUE | +→+ | | +→+ | | +→+ | | +→− | |
| /C2/ | CODE | K28.5(−) | | D2.2(+) | | K28.5(−) | | D24.5(+) | |
| | DATA | 001111 | 1010 | 010010 | 0101 | 001111 | 1010 | 001100 | 1010 |
| | RD VALUE | − | + | − | + | − | + | + | − |
| | CHANGE OF RD VALUE | −→+ | | +→+ | | −→+ | | +→− | |

(NOTE 1) CONFIGURATION ORDERED_SET /C1/, /C2/ CONSISTS OF 4 OCTETS WITH CONFIGURATION DATA 2 OCTET ADDED AFTER THE CODE SHOWN IN THIS TABLE, ALTHOUGH THE INDICATION THEREOF IS OMITTED THEREIN.

FIG. 22
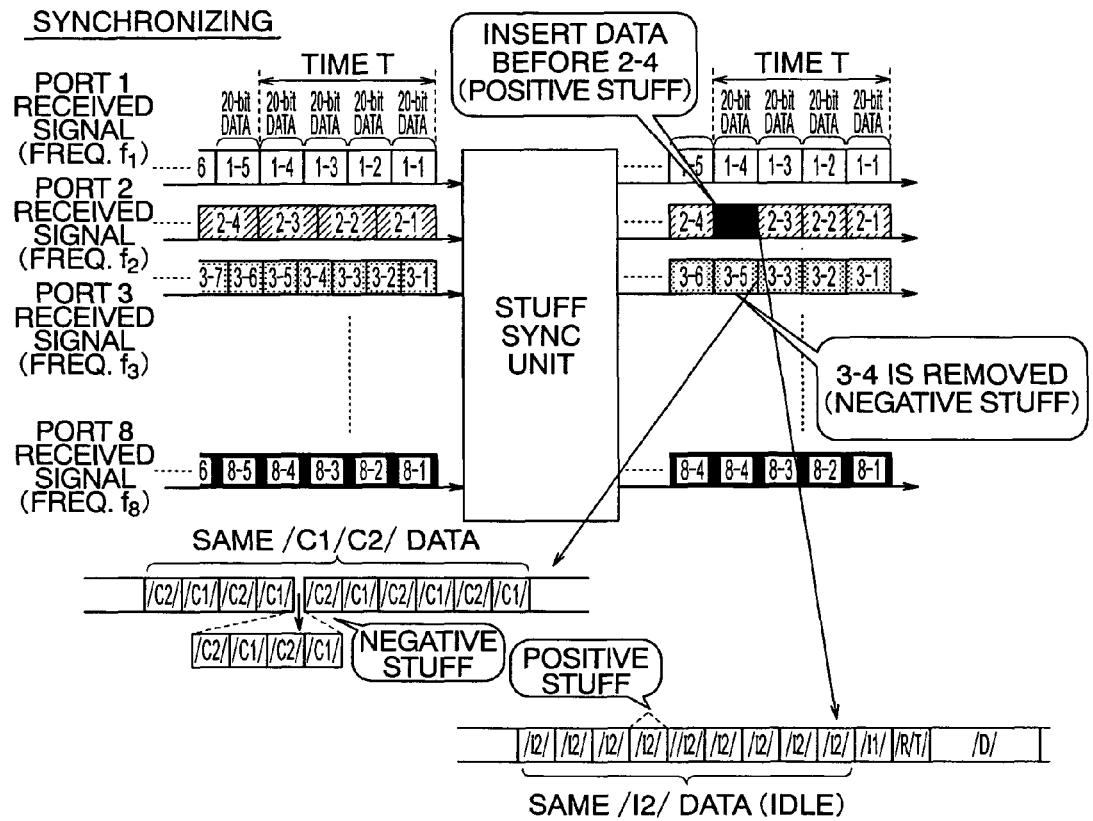
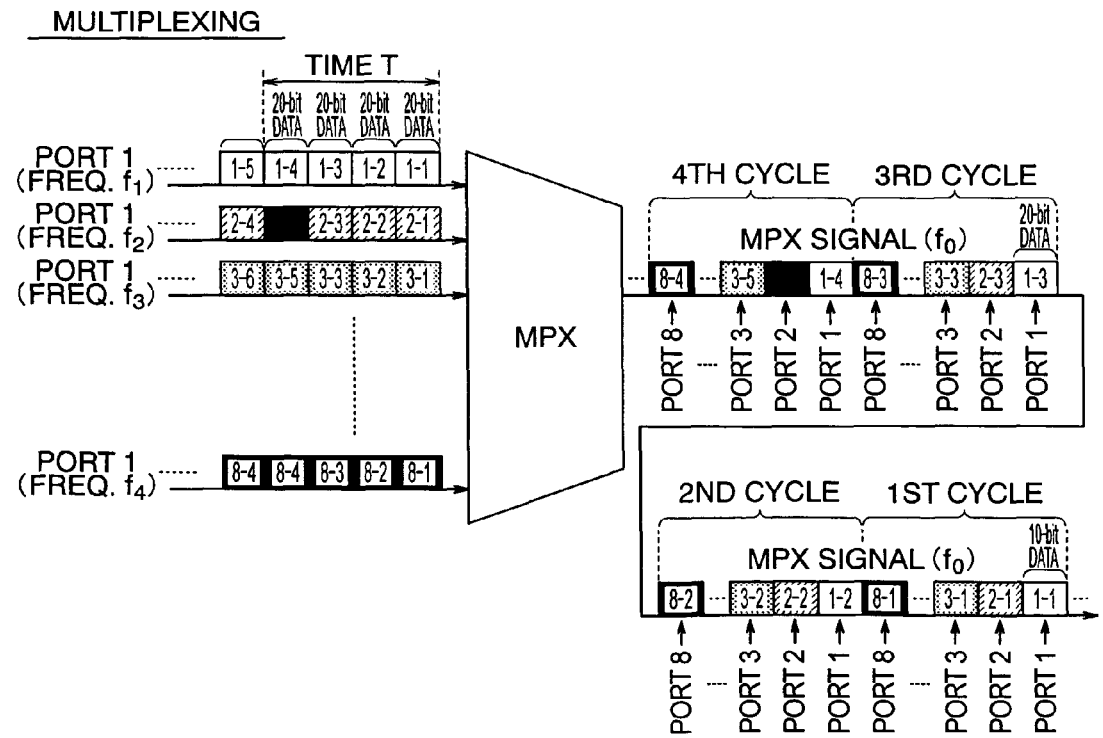

FIG. 26
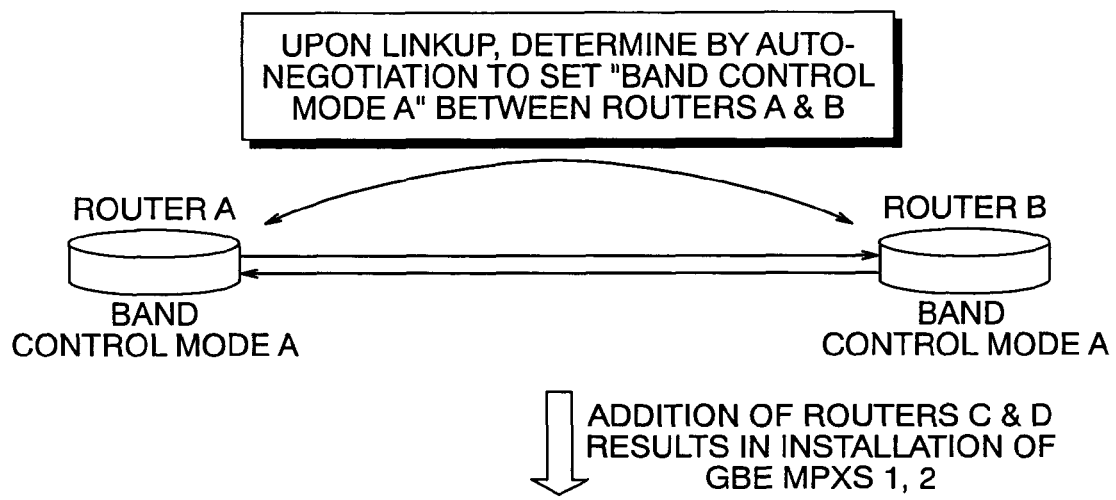
⇩ ADDITION OF ROUTERS C & D RESULTS IN INSTALLATION OF GBE MPXS 1, 2
AUTO-NEGOTIATION IS DONE BETWEEN ROUTERS A & B EVEN AFTER INSTALLATION OF GBE MPXS, SO THE BAND CONTROL OPERATION MODE IS KEPT UNCHANGED BEFORE AND AFTER THE INSTALLATION
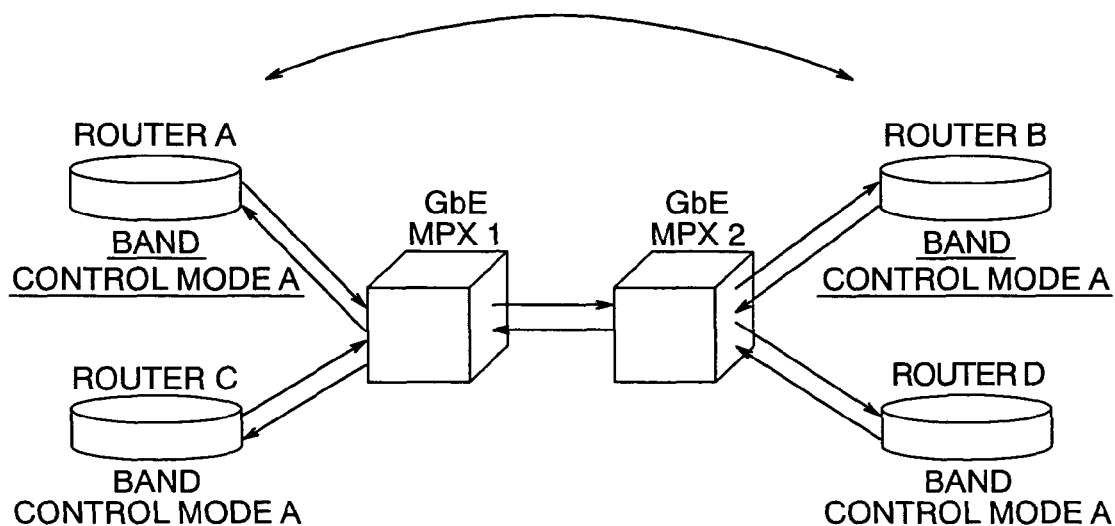

TRANSMISSION APPARATUS

INCORPORATION BY REFERENCE

The present application claims priority from Japanese application JP2005-299555 filed on Oct. 14, 2005, the content of which is hereby incorporated by reference into this application.

BACKGROUND OF THE INVENTION

The present invention relates to a transmission apparatus for multiplexing a plurality of signals which are transmitted based on 8B/10B codes, such as Gigabit Ethernet signals or Fibre Channel signals. Gigabit Ethernet is a registered trademark and will be referred to as "Gigabit Ether" or "GbE" hereinafter.

In recent years, broadband data communications lines including the Internet become widespread for home-use purposes also, and the demand for high-speed lines is growing with a central focus on IP traffic. To meet this demand, traditional major technologies in wide area networks (WANs), such as the synchronous optical network/synchronous digital hierarchy (SONET/SDH) and asynchronous transfer mode (ATM), are replaced by the Gigabit Ethernet™, which is becoming important more and more in the marketplace because of its advantages as to high-speed performances and low costs.

A Gigabit Ether signal is in conformity to the rules compatible to Fast Ethernet rules, which are widely used in office-use local area networks (LANs), at the second layer (layer 2) in an open systems interconnection (OSI) reference model. The signal type is divided into two major categories: 1000BASE-X which uses light as a transmission medium, and 1000BASE-T which uses as its transmission media an unshielded twisted-pair (UTP) cable of the category 5 or higher. In particular, the former, 1000BASE-X, is popularized in the market while covering the aspects of from accessibility to trunk lines. One reason is its superiority in transport distance, and another reason is that optical elements are commercially available at relatively low prices.

However, in another aspect, such line demand growth accompanies risks as to the depletion of fiber-optic core lines for signal transmission via these broadband links. In the currently established network which is arranged to use Gigabit Ether signals, it is the big theme of a transmission apparatus on a branch line or a mainline to find an approach to maximizing the number of GbE lines per single optical fiber. To do this, the transmission device has experienced attempts to employ various types of multiplexing methods to thereby improve its communications line accommodation efficiency. However, in addition thereto, the transmission device is strictly required, from an aspect of maintenance services, to be a "transparent" transmission device with the absence of any influence upon the existing networks after installation of this device. Note here that the transparent transmission device refers to a transfer device which performs multiplex transmission without adding any modifications to user signals to be accommodated therein.

A prior known Gigabit Ethernet (GbE) multiplexing device is the one that is based on the existing SONET/SDH technology and is recommended upon multiplexing of GbE signals to employ a technique of the type having the steps of terminating an 8B/10B code upon receipt of it, converting 10-bit data into 8-bit data, extracting a media access control (MAC) frame, applying data processing for encapsulation to the MAC frame in accordance with a method as defined in the request for comments (RFC) 1662 of Internet Engineering Task Force (IETF) or in the telecommunication standardization sector of International Telecommunication Union (ITU-T) Recommendation X.86 or ITU-T Rec. G.7041, and multiplexing by mapping into a SONET/SDH signal(s). In the prior art GbE multiplex device, the 8B/10B code is terminated at a time whenever a GbE signal is received, so it suffers from a problem as to the lack of an ability to pass through the 8B/10B code between client devices.

In order to solve this problem, according to the ITU-T Recommendation G.7041, a scheme which is called the transparent generic framing procedure (GFP-T) has recently been standardized for the purpose of permitting transparent pass-through without terminating the code of a physical layer, such as an ordered set as defined in 8B/10B code. The goal of this approach is to transparently transport the ordered set by execution of "64B/65B encoding" which is a technique for coding into 65-bit data including the ordered set information in units of 64-bit blocks in the event of conversion to an 8-bit digital data stream.

Unfortunately, this technique is also based on the use of the existing SONET/SDH technology. Thus it becomes necessary to use high-priced parts and electrical/electronic circuits for performing the SONET/SDH processing while at the same time requiring high price components and large-scale circuitry for performing the 64B/65B-encoding/decoding process. This lessens the advantages of GbE systems, which are becoming the leading edge technology in recent years in place of the SONET/SDH networks owing to the capability of arranging flexible networks at low costs.

Additionally, in GFP-T, various types of ordered sets that are defined by 8B/10B codes are implemented by mere use of a new encoding/decoding scheme. Several information items must be transmitted in a rounded form, so this scheme is not able to realize complete or full transparency. For example, the number of errors is converted into the fact indicating "one or more errors are found." Thus, the information concerning the quality of a layer 1, such as an indication of exactly how many errors were occurred, is terminated and disappeared here. This results in neglect of the functions as to the retention of physical line quality and the quality monitoring, which are important roles of a layer-1 device.

Upon installation of prior art GbE multiplexing devices, it does not come without accompanying some restraints which follow: (1) an ability is lost to automatically determine an optimal operation mode between user devices during auto-negotiation; (2) the switching in obstruction occurrence events is no longer performed in a proper way due to the lack of an ability to exchange obstruction information between the user devices; and (3) in case a preamble of MAC frame or the like is used for a unique function, such function becomes out of use.

In regard to the restraint (1), a maintenance serviceman is required to manually set up an operation mode irrespective of the fact that if the auto-negotiation is directly exchangeable between routers then the optimum operation mode is expected to be determined in an automated way. Regarding (2), a need is felt to realize it by use of an alternative means or realize by using auto-switching functionality at an upper-level layer or provide a limit such as installation only for those networks which are free from the need for backup or "spare" lines. As for (3), the present status is that the maintenance serviceman is forced to be patient with the restrictions on maintenance services, such as using none of the unique functions or installing a device which has its function alternative to the unique function. In addition, when installing the GbE multiplexer device in the event of modification or updating of a present network configuration, heavy workload is put in some cases to a service facility install division and/or maintenance group, such as a need to examine in advance whether various kinds of influences are present or absent.

It is therefore an object of this invention to provide a Gigabit Ethernet multiplexing apparatus with flexible expandability without having to take care of a variety of kinds of operation/maintenance restrains and influences upon services otherwise occurring due to the termination of 8B/10B code, such as a configuration ordered set of Gigabit Ether signal in the case of network configuration modification occurring due to variance of communication line demands, such as those stated supra.

SUMMARY OF THE INVENTION

To attain the foregoing object, this invention employs, rather than the approach to terminating an 8B/10B code as in the prior art, a scheme for performing data length adjustment (stuff synchronization) while saving the 8B/10B code rules and then performing interleave-multiplexing and separation while letting the 8B/10B code be kept unprocessed.

Specifically, a Gigabit Ethernet multiplexing apparatus which accommodates a number, N, of Gigabit Ether signals for applying thereto multiplexing separation is arranged to include N low-rate side signal receipt processing units for accommodation of Gigabit Ether signals, N 8B/10B code synchronizer units for establishing 8B/10B code synchronization, a stuff synchronizer unit for synchronizing N asynchronous signals with a single frequency, a port identifier inserter unit which inserts a port identifier for identifying which one of the N signals is received at which port, a multiplexing processor unit for applying interleave multiplexing to N synchronized Gigabit Ether signals to thereby generate a multiplex signal, a high-rate side multiplex signal transmitter unit for converting the multiplex signal into serial data of 1.25×N gigabits per second (Gbps) and then into an optical signal, a high-rate side multiplex signal receiver unit for receiving the multiplex signal that was converted to the optical signal and for developing it to parallel data, a separation processing unit for separating the interleave-multiplexed signal into N signals, a port identifier separator unit for separating the previously inserted port identifier, for performing one-to-one correspondence between the N Gigabit Ether signals and respective ports and for performing, based thereon, per-channel delivery processing, N 8B/10B-code synchronizer unit for detecting an 8B/10B code synchronization pattern of the N signals separated and for performing data sorting processing, and low-rate side transmission processor unit for changing the separated Gigabit Ether signals to a serial signal of 1.25 Gbps and for sending it to a user device linked.

In particular, the stuff synchronizer includes a stuff processing determination unit which has functionality for performing, upon execution of positive stuff or negative stuff processing, the positive/negative stuffing while avoiding generation of violation to 8B/10B code rules (abnormality of running disparity or "RD") by taking account of the RD-value regularity of 8B/10B code, and a data detector unit for verifying whether it is a code that does not generate RD abnormality, thereby to cause the N Gigabit Ether signals having frequencies $f_1, \ldots, f_N$ to be synchronized with a frequency $f_0$ of multiplex signal while keeping the 8B/10B code intact.

Other objects, features and advantages of the invention will become apparent from the following description of the embodiments of the invention taken in conjunction with the accompanying drawings.

BRIEF DESCRIPTION OF THE DRAWINGS

FIG. 1 is an example of an 8B/10B code conversion table which is disclosed in IEEE Standard 802.3z.

FIG. 2 shows an ordered set of 8B/10B code as defined in IEEE Std 802.3z.

FIG. 3 shows a way of 8B/10B code conversion along with a format of Gigabit Ethernet signal as defined in IEEE 802.3z.

FIG. 12 is a diagram showing a way for data resorting by an 8B/10B code synchronizer unit in the embodiment 1.

FIG. 13 is a diagram showing a way of transition of the running disparity of an ordered set /I1/, /I2/.

FIG. 14 shows rules concerning the transition of the running disparity of ordered set /I1/, /I2/.

FIG. 21 is actual examples of a port identifier as used in the embodiment 1.

FIG. 22 is a diagram specifically showing an appearance of data streams resulted from the processing of the stuff synchronizer unit and multiplexing processor unit.

FIG. 26 shows the behavior as to a band control mode in the case of employing Gigabit Ether multiplexing devices embodying this invention.

DETAILED DESCRIPTION OF THE EMBODIMENTS

Figure 4:
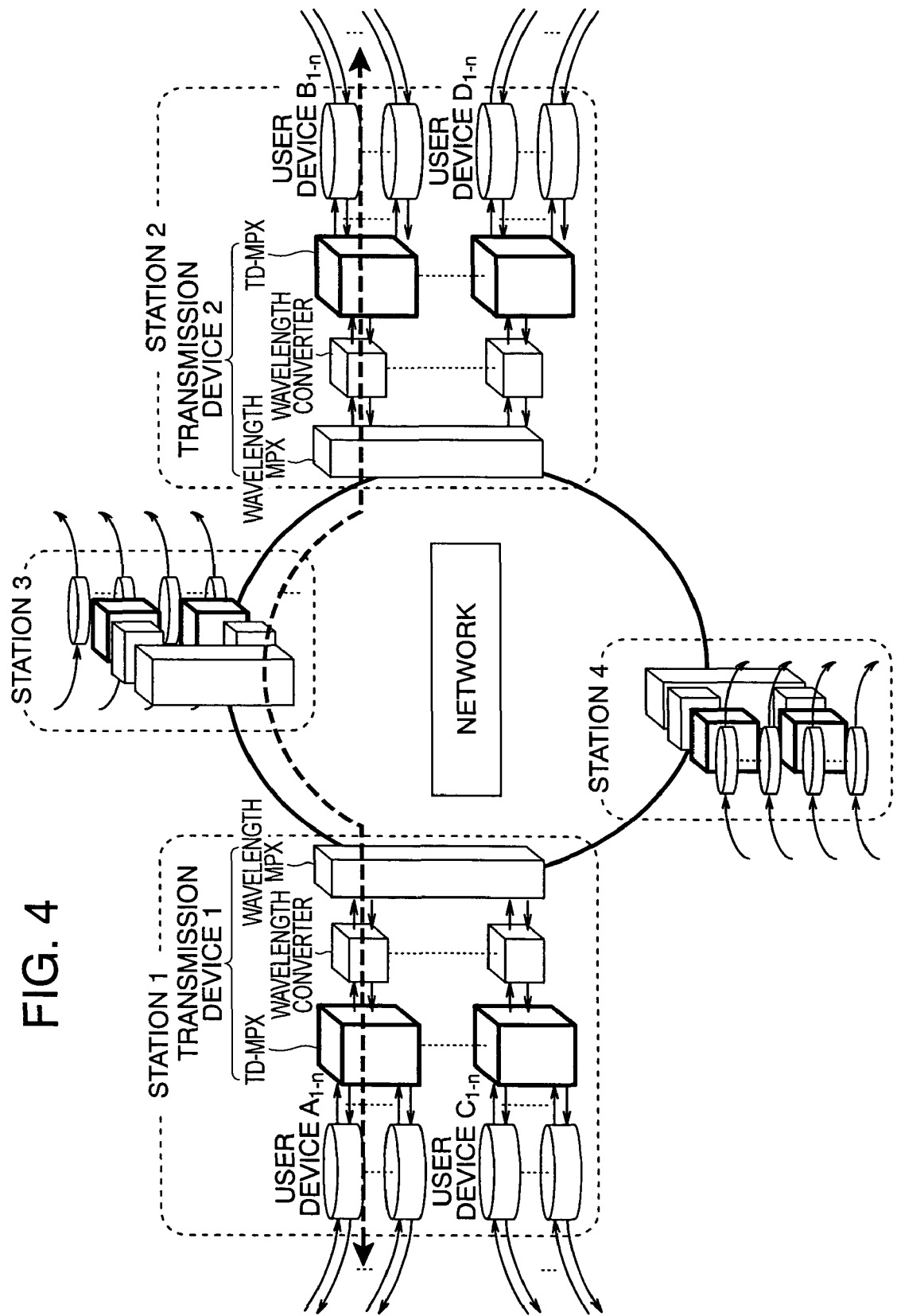
FIG. 4 is an application example of a "transparent" transmission device.

Prior to the description of a Gigabit Ethernet (GbE) multiplexing apparatus of the invention, a GbE signal will first be explained here. In the GbE signal, user data is transmitted in the form of a MAC frame as defined in IEEE Standard 802.3z, sections 2 to 3. In this respect, it is identical to Ethernet signals of 10BASE-T (data rate of 10 megabit per second) or 100BASE-T (data rate of 100 Mbps); however, the GbE signal is featured in that its data rate is 1 gigabit per second (Gbps) and that an 8B/10B code which is defined in IEEE Standard 802.3z section 36.2 is used as the code of a physical layer.

A part of the 8B/10B code table as defined by IEEE Std 802.3z is shown in FIG. 1.

8B/10B encoding refers to a scheme for encoding an 8-bit data into 10-bit data in deference to a conversion table such as shown in FIG. 1. For a single 8-bit data, two types of data are defined, one of which is a 10-bit data stream having more (or equal) logic zeros ("0"s) than logic ones ("1"s), and the other of which is a 10-bit data stream having more (or equal) "1"s than "0"s, while eliminating the use of a pattern with the ratio of the numbers of "0"s and "1"S being extremely unbalanced to either of them. This encoding scheme is a technique for performing encoding while taking a balance in such a way as to permit the number of 0s to become substantially equal to the number of 1s by the selective use of any one of these two kinds of data patterns—i.e., the data that consists of more (or equal) 0s than 1s and the data consisting of more (or equal) 1s than 0s—in accordance with an accumulated number difference (known as the running disparity or "RD") of 0s or 1s to be contained in a stream of codewords which was output until immediately before the encoding. More specifically, the processing is achieved in a way which follows: if 1s are greater in number than 0s in the running disparity (RD) at the time point of interest, then set the RD value to "+," followed by outward transmission of data on the Current RD+ side in the 8B/10B code table of FIG. 1; if 0s are more than is in the running disparity then set RD value to "−," followed by outward transfer of data on the Current RD− side in the 8B10B code table of FIG. 1. For example, an 8-bit data stream "00001010" is converted into 10-bit data of "010101 1011" when 0s are more than is in the running disparity at that time (i.e., RD is at "−") and is converted to 10-bit data of "010101 0100" in case more is than 0s are found in the running disparity (i.e., RD is "+"). On a signal receipt side, it is possible to detect the presence or absence of data errors by checking whether this RD value's rule is under compliance.

In this 8B/10B code, 256 kinds of data with a code group name being represented by "Dxx.x" and 12 types of special symbols with the code group name represented by "Kxx.x" are defined. A code (ordered set) with a combination of these codes and special symbols is for use as a flag "/I/" which indicates a null signal state such as an interframe gap (IFG) between MAC frames, a flag (/S/, /R/, /T/) indicative of the start position of a MAC frame or the end of a frame, or equivalents thereto.

See FIG. 2, which shows respective ordered sets and the meanings thereof.

These order sets include a code which is called the "Configuration" (/C1/ or /C2/). This code is for use in auto-negotiation (AN), which is for exchanging the operation mode or the state of a self device between linked devices. The auto-negotiation is a function that is defined in IEEE Std 802.3z, section 37.

In FIG. 3, there are shown a format of MAC frame defined in IEEE 802.3z and a format of GbE signal that is generated by applying 8B/10B encoding to MAC frame.

MAC refers to the protocol which belongs to the second layer (layer 2) of an open systems interconnection (OSI) reference model. Exchanging the protocol is defined in IEEE 802.3z. A frame during the exchange of the protocol is called the MAC frame. The role of MAC frame is to store the protocol and/or data of a third layer (layer 3) or its higher layers of the OSI reference model in a data field of MAC frame and also to reliably transfer this stored protocol of the third or higher layer to a target terminal. MAC frame consists essentially of a preamble (8 bytes) indicative of the beginning of MAC frame, a destination address (6 bytes) indicating a MAC address of a destination terminal of the MAC frame, a source address (6 bytes) indicating a MAC address of a terminal to which the MAC frame is forwarded, a length/type field (2 bytes) indicating the length or type of MAC frame, a data field (variable length) and a checksum value (4 bytes), wherein a data indicative of the null signal state, called the interframe gap (IFG) is flown between the MAC frame and a MAC frame adjacent thereto. This data stream of GbE signal with 8 bits being as a unit is converted (8B/10B-encoded) into a 10-bit data stream in units of respective bytes, resulting in acquisition of the GbE signal.

More specifically, a block of 8 bits of each byte is replaced by a 10-bit data stream (codeword, also known as code-group) or by an ordered set that is an ensemble thereof, while changing IFG to /I/ (idle), the byte at the beginning of MAC frame to /S/, a respective one of the preamble, destination and source addresses, length/type, data and checksum value (i.e., frame check sequence or "FCS") to one of 256 kinds of /D/s (data), and a byte immediately after the MAC frame to either /T/R/ or /T/R/R/. Note here that in the GbE signal, an 8-bit length data segment is converted into 10-bit length data on a per-byte basis, so the rate of a physical layer is 10/8 times greater than 1 Gbit/s, that is, 1.25 Gbps.

In this manner, the GbE signal is the one that is an 8B/10B-encoded version of MAC frame as defined in IEEE Std 802.3z. Its feature to be noted here is that upon 8B/10B-coding of GbE signal, management information (e.g., configuration ordered set /C1/, /C2/) other than the data being conveyed by MAC frame is contained in the 8B/10B code.

An example of a network configuration for multiplex-transport of the above-stated GbE signal is shown in FIG. 4.

A wavelength division multiplex (WDM) technique is used as a means for improving the accommodation efficiency of a single communications line. By performing wave-combining/separation while assigning a plurality of signals to respective wavelengths, the accommodation efficiency is expected to improve by a degree corresponding to the number of wavelengths being subject to the wave-combine/separation. Furthermore, if it is possible, by applying time-division multiplexing (TDM) to N GbE signals prior to the wave multiplexing to thereby provide a single physical signal, to accommodate N GbE signals with respect to a one wavelength, then the accommodation efficiency is improved by N times than that in the case where a single GbE signal is assigned to one wavelength. This makes it possible to more efficiently accommodate an increased number of communications lines for the existing network system. And, with an increase in IP traffic in recent years and a growing demand for higher line accommodation efficiency, such the GbE multiplexing apparatus is widely used in the marketplace.

A standardized approach to time-division multiplexing of a number, N, of GbE signals is to use a method having the steps of performing data processing relative to respective MAC frames to be received from N ports, executing encapsulation for adding thereto a header or checksum, and thereafter sequentially mapping into a SONET signal, such as optical carrier signal-level 48 (OC-48) or OC-192, or an SDH signal such as synchronous transfer mode level 16 (STM-16), STM-64 or else. In terms of the MAC frame encapsulation scheme, there are three major standardized techniques which follow: a technique for using high-level data link control (HDLC)-like framing technology as defined in IETF RFC1662, a technique for using the link access procedure SDH (LAPS) architecture defined in ITU-T Recommendation X.86, which is a similar method to the HDLC-like framing, and a technique for using frame-mapped generic framing procedure (GFP-F) technology as specified in ITU-T Rec. G.7041, which is known as general-purpose encapsulation methodology.

Figure 5:
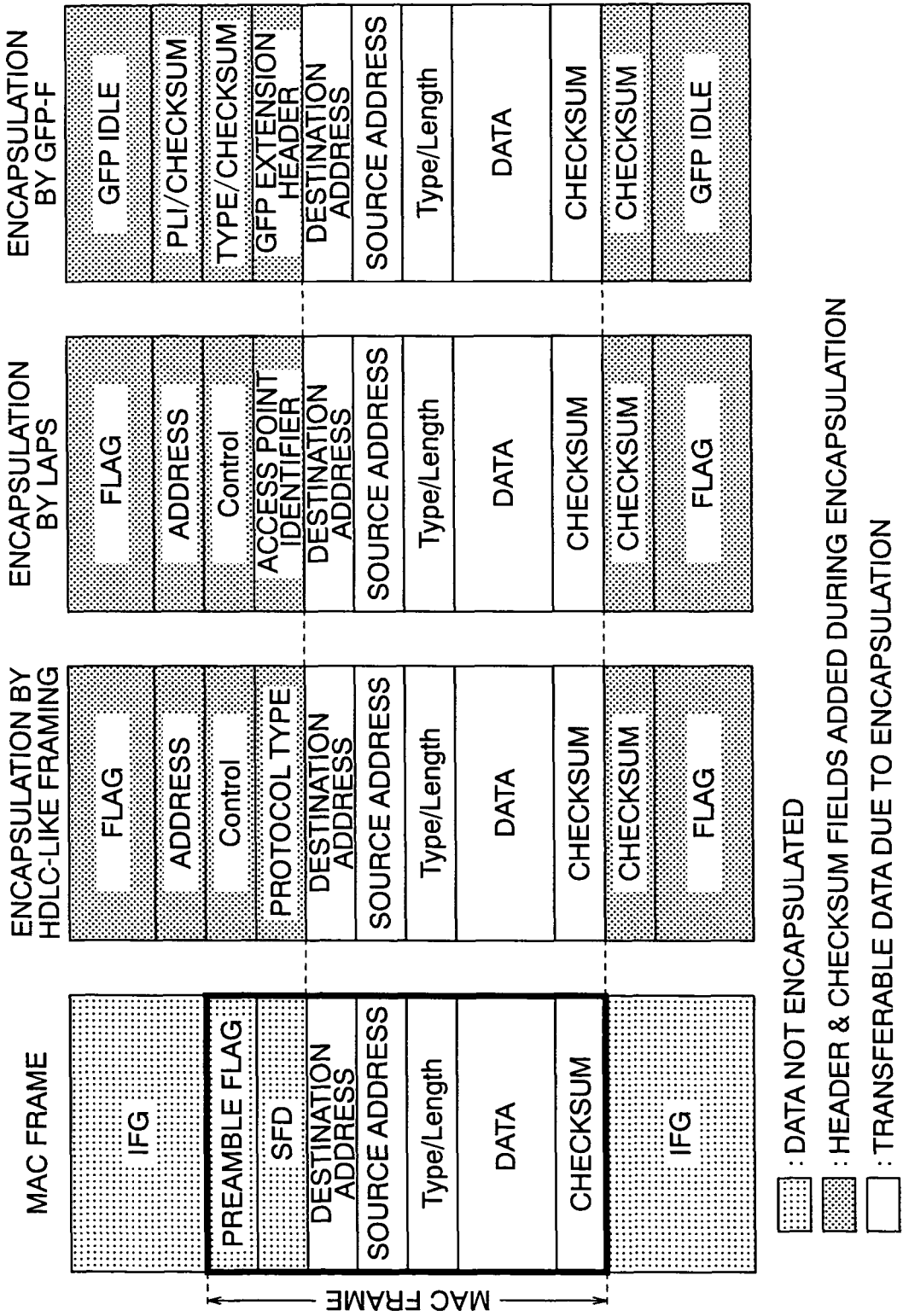
FIG. 5 is a diagram for comparison of an encapsulation method of MAC frame.

FIG. 5 shows a scheme for encapsulation of a MAC frame.

As shown herein, although any one of the above-noted techniques guarantees the transparency of the protocol of the layer 3 or higher ones from restrains of the encapsulation method, the 8B/10B code which belongs to the layer 1 and part of the data of MAC frame that belongs to layer 2 have been replaced in a multiplex separation session so that fully transparent transmission is not achieved in any way. The transparent transmission refers to equivalency, in the network configuration shown in FIG. 4, to a state that a user device A which is installed in a station building 1 is logically failed to be directly connected to a user device B that is in a station building 2, although a transmission device 1 and a transmission device 2 reside between these user devices A and B. Specifically, it indicates a transfer event for merely outputting an output signal of the user device A toward the user device B without altering the format and data contents thereof.

From now, the "transparency of 8B/10B code" and "transparency of MAC frame" will be described sequentially.

An explanation will first be given of the 8B/10B code transparency. Gigabit Ethernet (GbE) signals use an 8B/10B encoding scheme that is defined in IEEE Std 802.3z, section 36.2, as its coding technique for signal transmission. In this 8B/10B coding, special symbols which are not found in MAC frame are defined except the data to be contained in MAC frame. An Example of such special symbols is a configuration ordered set (/C1/ or /C2/) to be exchanged during auto-negotiation, which is used for the purpose of exchanging management information that is different from the user data. At user devices that process GbE signals, such as high-speed routers, several operations are performed including, but not limited to, exchanging between devices each other's operation mode and/or device status as the management information to thereby determine the optimum operation mode of each device and monitor a present link state in a bidirectional way.

Two major objectives of the auto-negotiation (AN) in 1000BASE-X are to (1) automatically set up the optimum operation mode by exchanging each other's information between the devices that share a GbE link prior to establishment of linkup, and (2) achieve bidirectional switchability by notifying the occurrence of an obstruction to a user device in the opposite direction B→A of the user devices whenever the communication line in the direction A→B is in failure. These processes are done by storing these information items in 16-bit data (Config_Reg) contained in the configuration ordered set shown in FIG. 2 and then mutually exchanging the 16-bit Config_Reg therebetween.

As previously stated in the introductory part of the description, the prior known Gigabit Ethernet (GbE) multiplexing apparatus is designed based on the SONET/SDH technology, in which defined is the approach to employing a technique for terminating an 8B/10B code upon multiplexing of a GbE signal, converting a 10-bit data into 8-bit data, extracting a MAC frame, applying to the MAC frame the data processing and encapsulation in accordance with the method defined in IETF RFC1662, ITU-T X.86 and/or ITU-T G.7041, and mapping it into a SONET/SDH signal for multiplexing. The 8B/10B code is terminated upon receipt of the GbE signal; thus, it is impossible to permit the 8B/10B code to pass through a channel between client devices. In the network of FIG. 4, in case the prior art GbE multiplexer apparatus is used, this transmission apparatus is not transparent to the 8B/10B code so that certain information, such as the operation mode of each router being contained in the configuration ordered set(s) to be exchanged during auto-negotiation, is no longer exchangeable directly between the routers, resulting in each router—this has been controlled to operate in its optimal operation mode prior to the installation of GbE time-division multiplex (TDM) apparatus—failing to operate in the optimum operation mode after the installation of GbE TDM device, whereby the band control does not work well, which leads in some cases to the occurrence of problems, such as the network's going into an unexpected overload state.

Next, an explanation will be given of the transparency of MAC frame. One approach to MAC frame multiplexing is to use the scheme for applying data processing and encapsulation to a MAC frame and for mapping it into a SONET signal as defined in Telcordia GR-253 or an SDH signal defined in ITU-T G.707 in the way stated previously.

Figure 6:
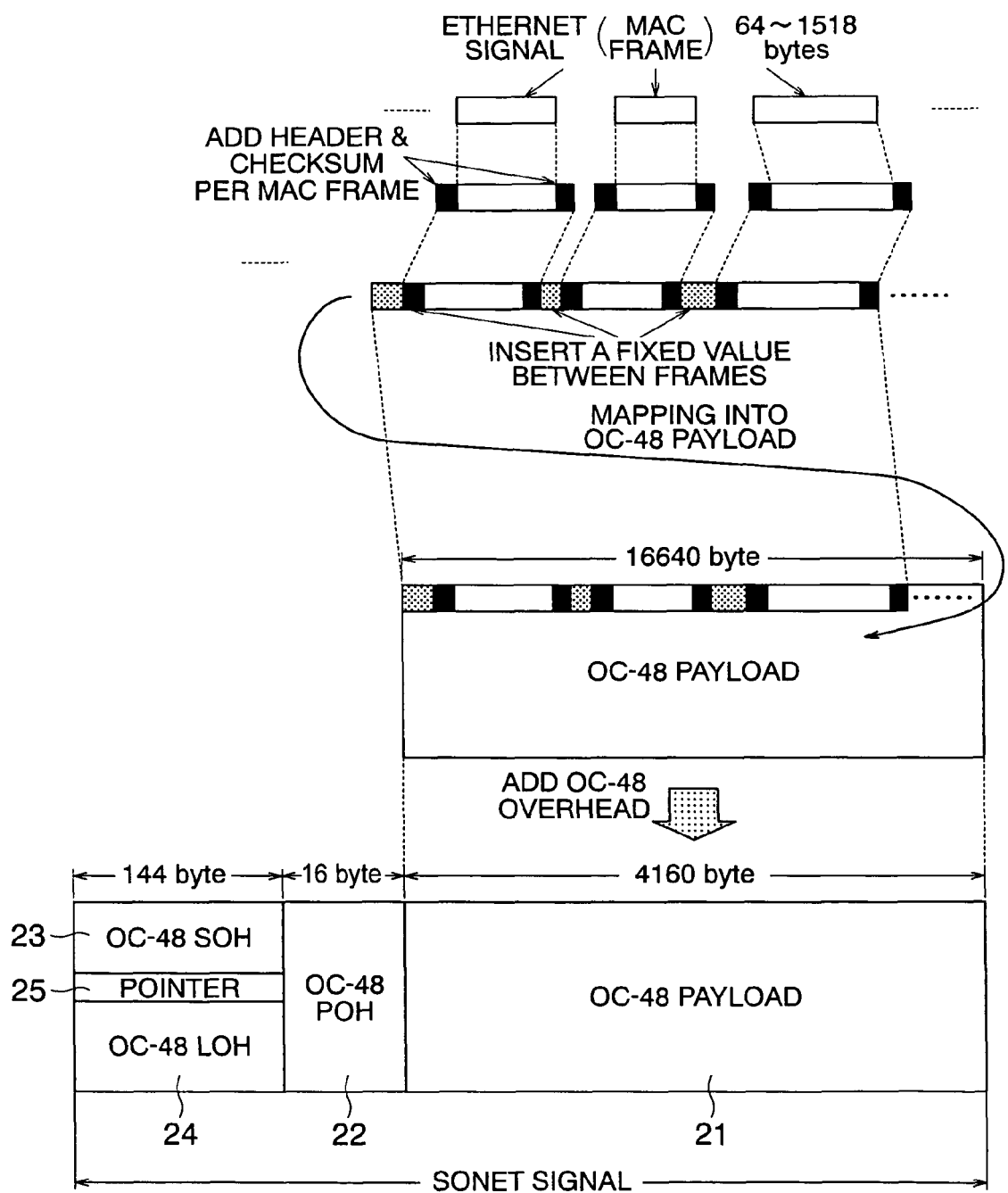
FIG. 6 is a diagram showing a way of mapping a MAC frame into a SONET signal.

A way for mapping into SONET signal is shown in FIG. 6.

First, as shown in FIG. 5, MAC frames are encapsulated in accordance with any one of the encapsulation schemes as defined by IETF RFC1662, ITU-T X.86 and ITU-T G.7041 stated previously. A predefined fixed value is inserted between the encapsulated MAC frames, resulting in creation of a consecutive data stream. Each of the encapsulation schemes is such that a header which complies with the encapsulation scheme is added to the start of a MAC frame while letting a checksum value be added to the end thereof.

This consecutive data stream thus generated is mapped into a SONET signal. FIG. 6 shows the case for mapping it into an optical carrier level-48 (OC-48) signal. First, the continuous data stream generated is mapped into an OC-48 payload. Then, various types of overheads of SONET signal, such as OC-48 pass overhead (POH), OC-48 section overhead (SOH), OC-48 line overhead (LOH), pointer, etc., are added, thereby producing the OC-48 signal. This frame structure and the overheads as used herein may be either the OC-48 signal as defined in Telcordia GR-253 or the synchronous transfer mode level-16 (STM-16) frame format defined in ITU-T G.707.

In the HDLC-like framing defined by IETF RFC1662 and the LAPS defined in ITU-T X.86, the scheme for performing mere encapsulation by adding a predefined header to the beginning of the data covering from a destination address to checksum and adding the checksum at its last part as shown in FIG. 5 is used. During the encapsulation, no changes are added to the data of from the MAC frame's destination address up to the checksum. It is thus possible to achieve transparent transmission. However, regarding a total of 8 bytes of the preamble and start frame delimiter (SFD), this part is replaced by a fixed value which is defined by respective recommendations and, for this reason, is terminated by this encapsulation processing. Regarding the interframe gap (IFG) also, this is replaced by a fixed value defined by respective recommendations and thus is ended by the encapsulation.

The generic framing procedure (GFP) as defined by ITU-T G.7041 is similar to the HDLC-like framing and LAPS in that encapsulation is done while adding a header to the data of from MAC frame's destination address to checksum, and is different from the two methods in that an area or "field" for insertion of a checksum value is defined relative to each header also. Additionally a space or "gap" between the frames encapsulated is filled with a GFP-specific fixed pattern, called the GFP idle. As shown in FIG. 6, the data of from the MAC frame's destination address to the checksum is mapped into a GFP payload.

Although any one of the above-stated schemes is the same in that encapsulation is performed by adding to MAC frame the header and checksum value, the data to be encapsulated of GbE signal is an ensemble of "destination address," "source address," "length/type," "data" and "checksum," which are minimally required in order to permit reliable transmission in a zone of the layer 2. In regard to the preamble that is part of the MAC frame and SFD plus IFG between MAC frames, these are all terminated, so it is impossible to transmit them transparently. Usually, the preamble, SFD and IFG are kept unprocessed except that a fixed value is inserted thereinto and are out of use. Thus, the termination thereof hardly affects the network. However, in cases where a system vendor presently uses the preamble and/or SFD for the purpose of comprising a unique function(s) in order to make the system offer its unique features, the termination of them in the GbE multiplexing apparatus can exert an influence on the network.

As previously stated in the background art part also, a technique called the transparent generic framing procedure (GFP-T) has been standardized in recent years for the purpose of permitting transparent transport without termination of the code of a physical layer, such as an ordered set defined in the 8B/10B code according to ITU-T Recommendation G.7041. This scheme is aimed at achievement, during conversion to an 8-bit data stream, of transparent transmission of an order set(s) by implementation of the "64B/65B encoding," which is the technique for coding into 65-bit data while letting the ordered set information be contained therein with 65 bits being as a unit. However, since this scheme also expects the use of the existing SONET/SDH architecture, it is required to employ high-priced parts and circuits for execution of the SONET/SDH processing while at the same time calling for the use of high-price components and large-scale circuitry that perform 64B/65B encoding/decoding, resulting in spoil of the advantages of GbE network, which recently becomes the mainstream in place of SONET/SDH networks because of the fact that the former is capable of constructing flexible networks at low costs.

Also note that in GFP-T, various types of ordered sets defined by 8B/10B codes are implemented by mere use of new encoding/decoding schemes, wherein several information items must be transmitted in a rounded form. Thus it is not the scheme capable of realizing full transparency. For example, the number of errors is converted into the fact which indicates "an error(s) is/are found," so the information on the quality of a layer 1, such as exactly how many errors were occurred, is terminated and disappeared here, resulting in neglect of the functionalities as to the retention of physical line quality and the quality monitoring, which are important roles of a layer-1 device.

Figure 7:
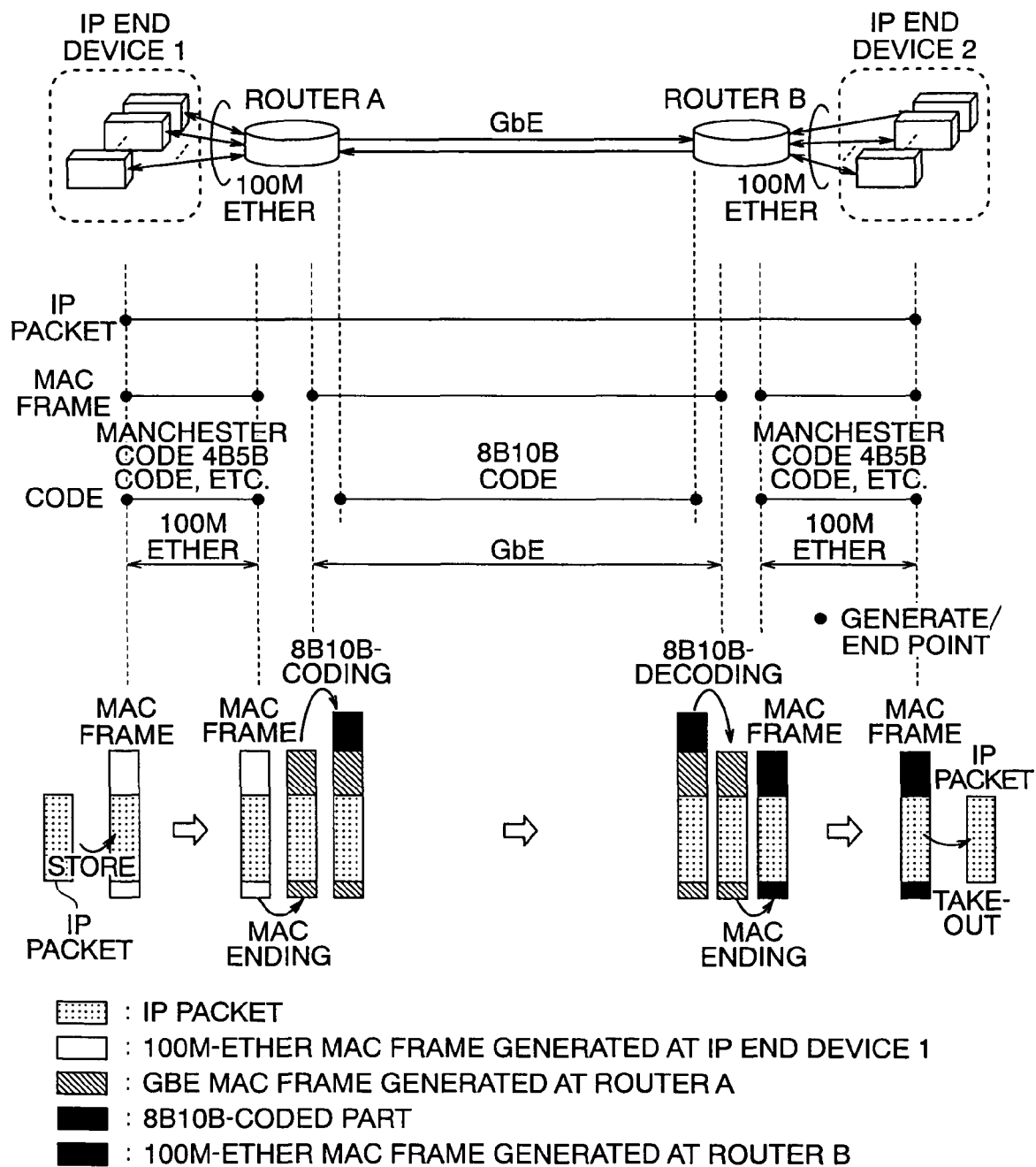
FIG. 7 is a diagram showing a way of generating and terminating each layer prior to the installation of a Gigabit Ethernet multiplexing apparatus.

FIG. 7 shows a way of generating, transmitting and terminating an 8B/10B code and MAC frame in a network that is mainly configured from routers and IP termination devices.

In this network, an IP termination device generates an IP packet, which is stored in a MAC frame of 100M Ethernet (100M Ether) and then sent to a router A. The router A once terminates the MAC frame of 100M Ether that was generated by the IP terminate device 1, generates MAC frame of Gigabit Ethernet (GbE), and sends an 8B/10B-encoded GbE signal to a router B. The router B receives the GbE signal from the router A, applies thereto 8B/10B decoding while terminating the MAC frame of GbE signal, regenerates MAC frame of 100M Ether, and transmits the generated 100M Ether MAC frame to an IP terminate device 2. This IP terminate device 2 terminates the MAC frame as received from the router B for extraction therefrom the IP packet that has been generated at the IP terminate device 1. Exchanging this IP packet brings communication between the IP terminate devices. In the arrangement of FIG. 7, an 8B/10B code-defined configuration ordered set is exchanged between the routers A and B which are interconnected by GbE signal during auto-negotiation for execution of two-way monitoring of a link and negotiation of an optimal operation mode between respective devices. This ordered set is generated at each router during 8B/10B coding and will be terminated at the time of 8B/10B decoding. Each of the above-stated procedures is the processing as defined in several recommendations of IEEE Std 802.3z and others.

In the network shown in FIG. 7, where subscribers to the IP terminate devices increase in number or where the amount of sending/received data per subscriber increases, network expansion and modification take place from time to time, such as additional installation of routers in a way corresponding to this increase in traffic and interconnection between these added routers.

Figure 8:
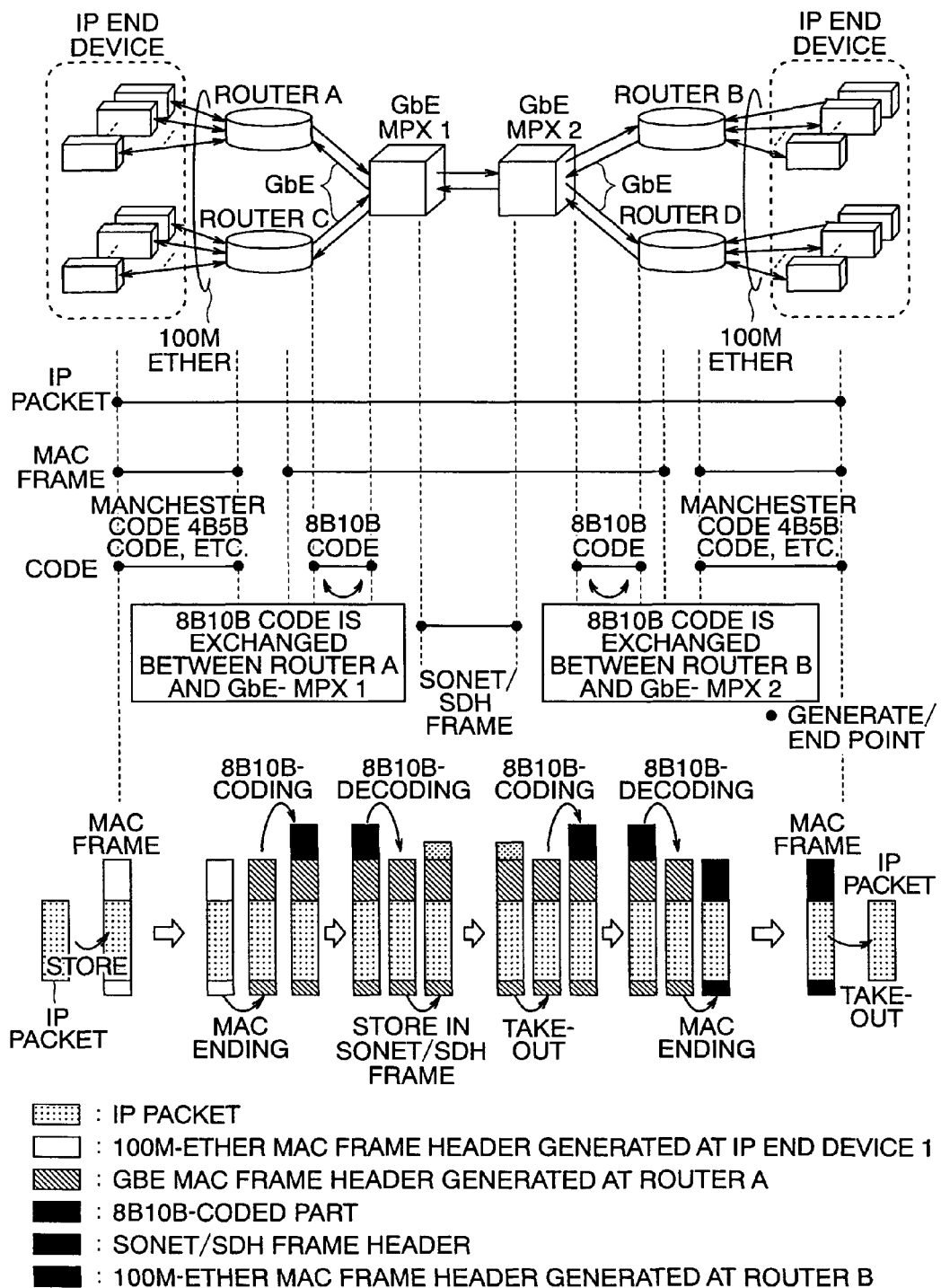
FIG. 8 is a diagram showing a way of generating and terminating each layer after the installation of prior art Gigabit Ethernet multiplexing devices.

FIG. 8 shows a network configuration which is modified from that of FIG. 7 so that routers C and D are added and Gigabit Ethernet (GbE) multiplexing devices 1 and 2 are newly installed for multiplexing a communications line between the added routers with the lines of the existing routers (e.g., a router A to router B line) to thereby achieve accommodation in the existing fiber-optic cable and a way of generation and termination of protocols in respective layer. Suppose that the GbE multiplexing devices as shown herein are prior known GbE multiplexer devices. Installing the GbE multiplex device between the added routers makes it possible to combine or "bundle" two GbE signals into a single physical signal for transmission. Thus, it is no longer necessary to newly rail a fiber-optic cable for connection therebetween.

However, in case prior art GbE multiplexing devices are installed between the routers A and B and between the routers C and D of FIG. 7 to provide a modified network configuration such as shown in FIG. 8, although the configuration ordered set to be exchanged during auto-negotiation has been directly exchangeable between the router A and router B prior to installation of the GbE multiplexer devices in FIG. 7, it becomes impossible after having installed these devices as shown in FIG. 8 to directly exchange the configuration ordered set between the routers due to the fact that the 8B/10B code is forced to terminate at GbE multiplexer device resulting in the configuration ordered set exchange being individually performed between each router and its associated GbE multiplexer device. In other words, it is no longer possible to exchange the configuration ordered set during auto-negotiation, although the installation of GbE multiplexers surely leads to an increase in main-signal line accommodation efficiency.

Accordingly, when services are restarted after having completed the work for additional installation of the routers C and D, it is no longer possible for not only the routers C-D but also the existing routers A-B to directly exchange each other's optimal operation mode. Thus, it will possibly happen that each router operates in an operation mode different from the mode prior to the installation of GbE multiplexing devices, i.e., in an operation mode that is not optimized. In the worst case, the balance of network workloads is lost, resulting in risks as to going into in an unpredictable overload state. Additionally, when obstruction occurs in the communications links, the switching to a spare line is not performed, so there is a risk of giving serious damages to the services within a time period until recovery.

FIG. 8 is a diagram showing a case where prior art GbE multiplexing devices do not terminate MAC frame.

In FIG. 8, the prior art GbE multiplexing devices are designed to avoid the termination of MAC frame; however, in a strict sense, a data stream following the destination address of MAC frame is realized by the encapsulation scheme in accordance with IETF RFC1662, ITU-T X.86 or ITU-T G.7041 so that MAC frame's preamble, SFD and IFG are all terminated by GbE multiplexer device. In case either the preamble or SFD which is part of MAC frame or the IFG field between MAC frames is already used by a device vendor for the purpose of comprising a unique function in order to provide a distinguishable device feature, the installation of prior art GbE multiplexer device would result in that such unique function comprised on the router side becomes out of use. This can affect the services.

As apparent from the foregoing, the installation of prior art GbE multiplexing devices is faced with constrains which follows: (1) it becomes impossible to automatically determine the optimal operation mode between user devices by means of the auto-negotiation; (2) proper switching upon occurrence of obstruction is no longer executable because of the lack of an ability to exchange obstruction information between the user devices; and (3) when the preamble or else of MAC frame has already been reserved for a specific function, such function becomes incapable of being used any more. Concerning the problem (1), regardless of the fact that if auto-negotiation is directly exchangeable between the routers then the optimum operation mode is expected to be automatically determined, a maintenance service person is required to manually set up the operation mode on a case-by-case basis. Regarding (2), it is needed to realize it by an alternative means or by use of auto-switch functionality at an upper-level layer, or to provide certain limit such as installation only in networks free from the need for a spare communications line. As for (3), it is in the circumstance that the maintenance serviceman is compelled to withstand certain constraints on maintenance services, such as avoiding the use of the unique function or installing a device having a function alternative to the unique function; in addition thereto, whenever modifying the network configuration, it is required to consider in advance whether various influences are present or absent upon installation of a GbE multiplexing device. This sometimes poses heavy workload to the facility install division and maintenance division of a service provider.

Consequently, the present invention was made to provide a Gigabit Ethernet (GbE) multiplexing apparatus which offers flexible extendability while avoiding the risks of various maintenance restrains and influence upon services otherwise occurring due to the termination of 8B/10B codes, such as configuration ordered sets of GbE signals, upon modification of the configuration of a network as necessitated due to a variation of communication line demands stated previously.

Figure 9:
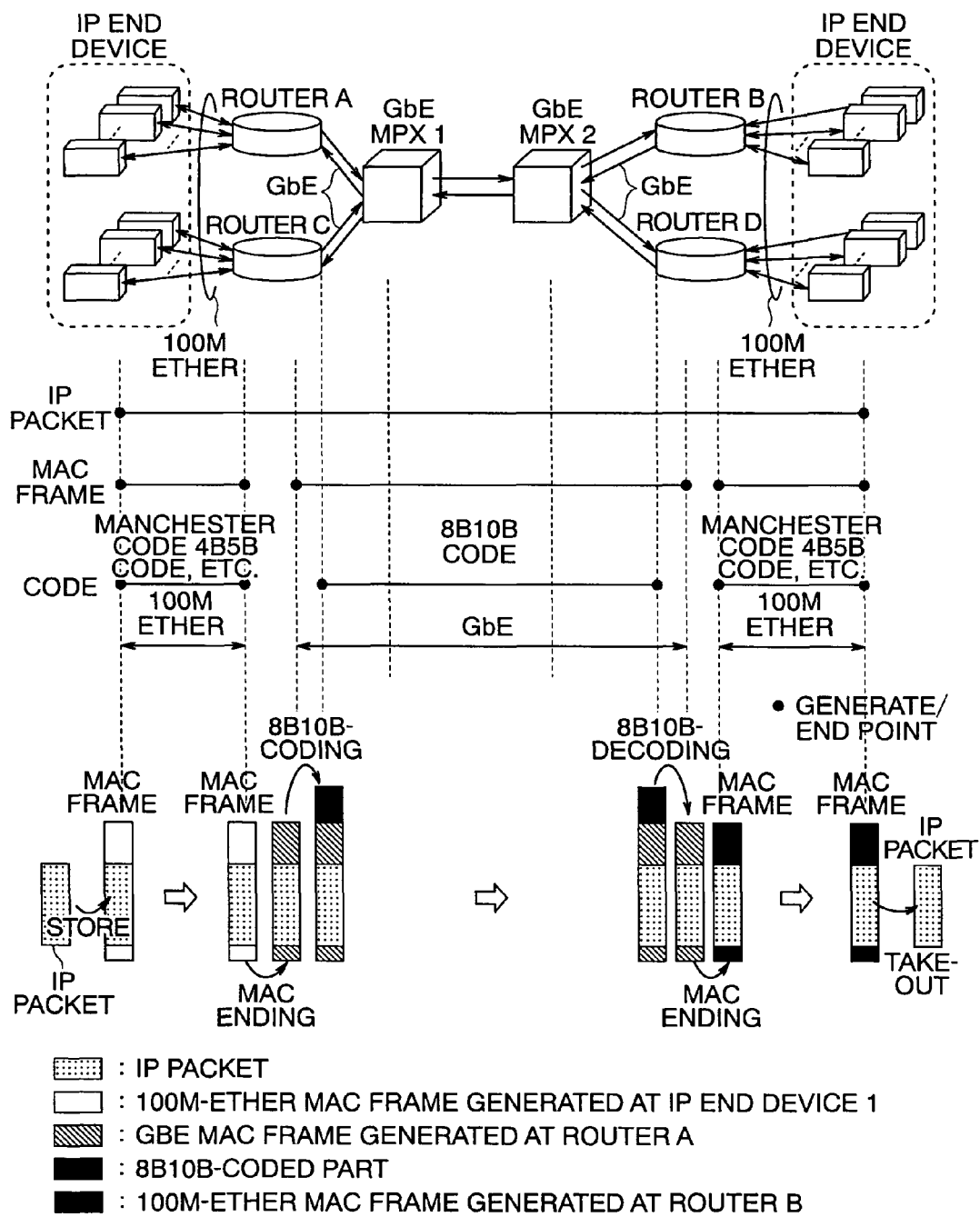
FIG. 9 is a diagram showing a way of generating and terminating each layer after having installed Gigabit Ethernet multiplexing devices of this invention.

A digital communications network configuration with the installation of GbE multiplexing devices embodying the invention is shown in FIG. 9, along with a way of generation and termination of respective layer signals and protocols. In the case of installing the GbE multiplexing devices of this invention, the way of generation and termination of each layer is kept unchanged from that prior to the installation (FIG. 7). This makes it possible to improve the line accommodation efficiency without affecting the existing network.

To achieve the GbE multiplexing device that does not terminate the 8B/10B code stated supra, multiplex separation may be done while letting 8B/10B code be kept unprocessed or "intact" without terminating 8B/10B codes of a plurality of GbE signals received. IEEE Standard 802.3z allows the data rate of GbE signal to be variable within a range of +/−100 ppm with 1.25 Gbps being set at the center thereof. For this reason, the multiplex separation usually requires certain processing called the "synchronization", which causes several data rates (i.e., frequencies)—these are slightly different per each received signal—to match a single data rate (frequency).

Figure 10:
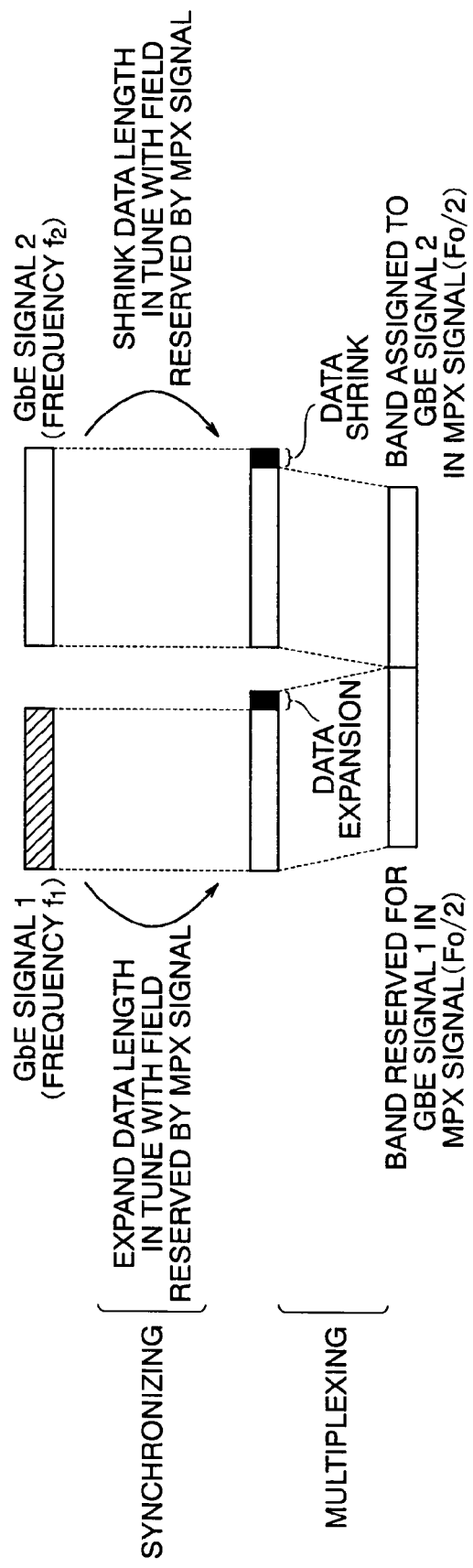
FIG. 10 is a conceptual diagram of stuff synchronization processing.

See FIG. 10, which is a conceptual diagram of the synchronization processing.

In FIG. 10, there is shown an exemplary case where a GbE signal having its frequency of $f_1$ and a GbE signal with a frequency $f_2$ are multiplexed together into a frequency $f_0$. Note here that a one-half frequency band of a multiplexed signal is assigned to the GbE signal 1 whereas the other half is to GbE signal 2, wherein a relationship of $f_2 > f_0/2 > f_1$ is supposed to be established. As the frequency of GbE signal 1 is less than the half band ($\frac{1}{2}f_0$) of the multiplexed signal, the data amount of GbE signal 1 to be received within a fixed length of time period becomes smaller than the half data amount of the multiplex signal. Thus, in order to perform the multiplexing, it is needed to use the processing for adding a prespecified amount of data to the received GbE signal 1, thereby matching it to the data amount assigned to the multiplex signal.

The above-stated processing that adjusts the data amount by addition/deletion of fixed data pursuant to a frequency difference is called the stuffing synchronization. The stuff synchronization of this invention employs a technique for expanding or shrinking the length of an IFG (i.e., null signal zone) that exists between MAC frames, thereby to absorb a difference in data length occurring due to the frequency difference. However, it is still required to realize the data expansion/shrink without violating various code rules for 8B/10B codes, such as the running disparity (RD). This invention provides a technique for performing frequency adjustment by data expansion/shrink while avoiding violation of the 8B/10B code rules.

The Gigabit Ethernet (GbE) multiplexing apparatus using this scheme is featured in that even after the installation of it the direct auto-negotiation is performed in a similar way to that at the time the routers are directly linked together via a fiber-optic cable and in that the apparatus is a transparent GbE multiplexing device capable of permitting direct pass-through of the preamble and SFD that are parts of a MAC frame while keeping them unprocessed.

Practically implemented forms of the GbE multiplexing apparatus embodying the invention will be described in detail with reference to the accompanying drawings below.

The GbE multiplexing apparatus of this invention is a device which executes multiplex separation between a plurality of main signals (1000BASE-SX/1000BASE-LX) of low rate, which are 8B/10B-encoded in a way as defined in IEEE Standard 802.3z, and a single multiplexed main signal of high rate. This device is characterized by having a multiplex separation function capable of performing direct exchanging using 8B/10B code between user devices, such as auto-negotiation, by allowing the 8B/10B code to pass through toward a user device on the opposite side through execution of multiplexing separation while keeping the 8B/10B code intact without altering the 8B/10B code being presently used by a user device that is connected to the low rate side of the GbE multiplexing apparatus of this invention upon execution of the multiplex separation.

Although in specific embodiments of this invention an example will be set forth for explanation purposes which uses Gigabit Ether (GbE) signals (1000BASE-X) as defined mainly in IEEE Std 802.3z, those signals using 8B/10B code, such as Fibre Channel signals based on ANSI standards, are all the same in principle, and, as will be indicated in the embodiments to be later described, there are explained a transmission device which is arranged to perform multiplex separation by taking account of the retention of the characteristics of 8B/10B code and the continuity of RD value while keeping the 8B/10B code intact without decoding 8B/10B code of GbE signal or else to thereby multiplex a number, N, of 8B/10B-encoded signals different in frequency from one another into a certain single frequency and thereafter again separate it into N 8B/10B-coded signals and a transmission system using such the GbE multiplexer device.

Embodiment 1

Figure 11:
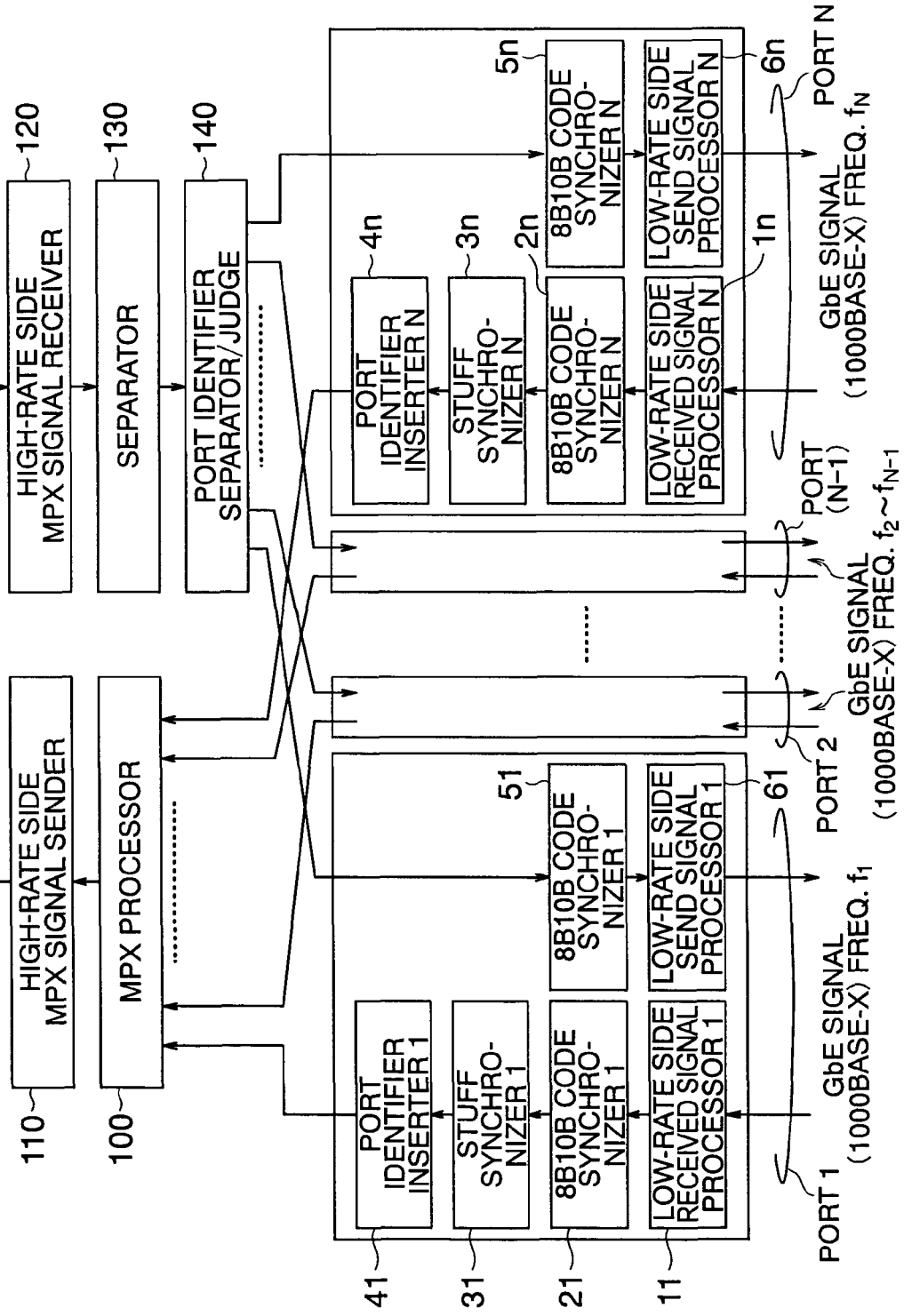
FIG. 11 is a diagram showing a configuration of Gigabit Ethernet multiplexing apparatus in accordance with an embodiment 1 of the invention.

FIG. 11 shows, in block diagram form, a configuration of a Gigabit Ethernet (GbE) multiplexing apparatus in accordance with a first embodiment of this invention.

As shown herein, the GbE multiplexer device embodying the invention is generally made up of a predetermined number, N, of low-rate side received signal processing units 11 to in which receive N 8B/10B-encoded GbE signals and convert them into electrical signals after extraction of a clock(s) and then apply thereto data processing for creation of a parallel data, N 8B/10B code synchronizing units 21-2$n$ which independently detect an 8B/10B code synchronization pattern relative to a respective one of the above-noted N GbE signals that have been converted into the electrical signals and perform data bit alignment rearranging or sorting processing, stuff synchronizer units 31-3$n$ for synchronizing N GbE signals that differ in frequency from one another in a range of +/−100 ppm in maximum into a single specific frequency $f_0$ port identifier inserting units 41-4$n$ which insert a port identifier for identification of a multiplexed time slot position of N 8B/10B-encoded GbE signals, a multiplex processing unit 100 which performs interleave-multiplexing of the respective signals to generate a multiplexed signal, a high-rate side multiplex signal transmitter unit 110 which converts the multiplexed signal into a serial data of 1.25×N gigabits per second (Gbps) and then to an optical signal, a high-rate side multiplex signal receiver unit 120 which receives the multiplexed signal that was converted to the optical signal and converts it to an electrical signal after clock extraction for development or "stretching" into parallel data, a separation processing unit 130 which processes the paralleled multiplex signal to separate the interleave-multiplexed multiplex signal into N signals, a port identifier separator unit 140 which performs separation of the prior inserted port identifier and performs one-to-one corresponding between the N GbE signals and respective ports and, based thereon, performs distribution on a per-channel basis, N 8B/10B code synchronizer units 51-5n which detect respective 8B/10B code sync patterns independently of each of the separated N GbE signals and then perform data sorting, and low-rate side received signal processing unit 61-6n which alter the separated parallel GbE signal to a serial signal of 1.25 Gbps and convert it into an optical signal and then send it to a presently linked user device as N GbE signals. This GbE multiplexer device is characterized in that the intended 8B/10B code transparency between user devices is realizable because of its ability to achieve a frequency difference absorption scheme (synchronization processing method) which utilizes the features of 8B/10B code without decoding 8B/10B codes of N GbE signals to thereby enable execution of the multiplex separation while letting 8B/10B code be kept unprocessed.

More specifically, after N GbE signals that are received at the N low-rate side received signal processor units 11-1$n$ are converted by the low-rate side received signal processors 11-1$n$ into electrical parallel data, symbols each containing a fixed pattern for the code synchronization use, called the "comma" delimiter, are detected at the N low-rate side 8B/10B code synchronizers 21-2$n$, respectively. A typical example of the comma-containing code is /K28.5/ which forms an ordered set, such as /I/ that indicates a null signal state or /C/ indicating that auto-negotiation is being performed. Since this comma-containing code is not generated within another codeword of 8B/10B codes nor across the boundary between any adjacent codewords, it is generally used for detection of a break position of each codeword. Upon detection of the break position of a codeword by detecting this comma pattern at the 8B/10B code synchronizers 21-2$n$, data queue changing or sorting is performed in a way such that the data stream of parallel signal is identical to the codeword break position as shown in FIG. 12, followed by sending the sorted data to the stuff synchronizers 31-3$n$.

In order to time-division multiplex N GbE signals having frequencies $f_1$ to $f_n$ into a certain fixed frequency $f_0$, it is needed to amend a frequency difference therebetween and then multiplex it to the same frequency after synchronization. The GbE multiplexer apparatus of this invention employs as this synchronizing scheme a stuffing technique which is the prior known synchronization technology, for applying positive stuffing or negative stuffing to intrinsic data and for performing expansion/shrink of the data length in accordance with the frequency difference to thereby achieve adjustment and synchronization.

Meanwhile, for the 8B/10B code, the polarity of "+" or "−" at the end of an output codeword is defined pursuant to a running disparity (RD) of "0" or "1" as contained in the codeword. For its following codeword, a codeword with its polarity matching this polarity is selected from the 8B/10B code table (FIG. 1), thereby to determine the data to be sent forth. The RD value as cited here for the codeword selection is defined to be an RD value at the start of such codeword. On the signal receive side, any data with the RD value at a tail end between codewords failing to be identical to RD value at the start thereof (i.e., violation against RD code rules) are counted as invalid data. Accordingly, when performing synchronization of 8B/10B-encoded signals, a need is felt to implement positive/negative stuffing while guaranteeing the continuity of RD value in the 8B/10B code rules. An example is that in case RD values at the start and end of a codeword (or a codeword train) to be subject to positive/negative stuffing are inverted in polarity from "+" to "−" or from "−" to "+," the RD value continuity between codewords is lost so that it is judged to be invalid data. Thus the codeword stream being stuffed is required to ensure that its RD values at the start and end thereof are kept unchanged, such as "+"→"+" or "−"→"−."

From the foregoing, it is desirable in order to periodically amend a frequency difference that the positive/negative-stuffed code stream be a code stream which (1) is guaranteed to have the capability of receiving a signal at fixed time intervals and (2) does not invert its preceding and following RD values. IEEE Std 802.3z sets forth that an ordered set /C/ (configuration ordered set) for execution of auto-negotiation is sent continuously prior to linkup between user devices such as routers; thus, only /C/ is sent until establishment of the linkup. On the contrary, upon completion of the auto-negotiation and after linkup, /C/ is not sent; instead, an ordered set /I/ (idle) indicative of the presence of a null signal state between MAC frames is transmitted. In this way, GbE signal is defined by IEEE 802.3z to transmit /C/ or /I/ at a certain ratio or greater without regard to the linkup state. If stuff synchronization is implemented for the ordered set /I/ or /C/ irrespective of the linkup state, then it is possible to guarantee that a chance must come for performing stuff synchronization at a constant rate. Thus it is possible to absorb the frequency difference between signals.

An explanation will first be given of the synchronizing processing relative to the ordered set /I/. IEEE Std 802.3z sets forth that a null signal state is present between MAC frames and that /I/ of more than fixed length must be sent within this time period. /I/ consists of a stream of two kinds of codes, i.e., /I1/ (=/K28.5(+)/D5.6(−)) and /I2/ (=/K28.5(−)/D16.2(+)), which are shown in FIG. 2. A codeword of /I1/ and /I2/ and a way of transition of its RD values are shown in FIG. 13. As shown herein, /I1/ is the ordered set which inverts RD value from "+" to "−" at the beginning and end thereof whereas /I2/ is the ordered set that does not inverts RD value and forces it to stay at "−" at its start and end. Of the codeword stream of /I/s, /I1/ is used only when RD value at the end of an immediately preceding codeword is at "+"; thereafter, /I2/ is chosen consecutively. By performing positive or negative stuffing per ordered set which keeps RD values noninverted at the start and end in the way stated above, the stuff synchronization is made possible without occurrence of violation against the RD code rules. This permits execution of stuff synchronization at the timing of /I2/ of received data. It can be said that even when applying stuffing to one of consecutive /I2/s, no appreciable influence occurs on the transfer contents of information.

Next, the synchronizing process for the ordered set /C/ will be discussed. IEEE 802.3z defines two kinds of ordered sets /C1/ and /C2/ shown in FIG. 2 as the ordered set /C/ to be sent during auto-negotiation. /C1/ is configured from /K28.5/D21.5/Config_Reg/ and /C2/=/K28.5/D2.2/Config_Reg/. /C1/ and /C2/ must be sent and received alternately during auto-negotiation. Note here that "Config_Reg" making up /C1/, /C2/ consists of two codewords storing therein data indicative of the operation mode of a client device which sends GbE signal, such as a router. During auto-negotiation, respective client devices exchange therebetween information as to their operation modes via Config_Reg of /C1/, /C2/ to thereby mutually determine the optimum operation mode of each. IEEE 802.3z also prescribes that the value of this Config_Reg is to send a fixed value within a predetermined length of time period (10 to 20 milliseconds), so the ordered sets of /C1/ C2/ are consecutively sent and received by the same data within such period.

A transition pattern of the ordered set /C/ is shown in FIG. 14.

In order to perform positive/negative stuffing while assuring the RD value continuity for this codeword stream, positive/negative stuffing may be done while grouping those codewords with the first and last RD values noninverted into a single block in a similar way to the case of stuffing /I2/.

Since the polarity of RD value differs depending on the value of Config_Reg contained in both /C1/ and /C2/, two cases are thinkable, one of which is that RD value is inverted, and the other of which is with RD value being noninverted. This results in that transition patterns of the running disparity of the ordered sets /C1/C2/ to be sent and received become four kinds of ones shown in FIG. 14. It can be seen from this diagram that as a feature of ordered set /C/, if a total of sixteen codewords of /C1/C2/C1/C2/ (/C1/ and /C2/ are each formed of four codewords) is grouped into a single block while the value of Config_Reg is kept unchanged, then a data stream is given in which RD values are not inverted at the beginning and tail end thereof. Accordingly, performing positive or negative stuffing with either 16 codewords or its multiple number of codewords being as a unit makes it possible to achieve the stuff synchronization while retaining RD values during auto-negotiation. It is also specified in IEEE 802.3z that in case a codeword stream which is defined as /C1/, /C2/ in the codeword stream /C/, such as /K28.5/D21.5/K28.5/ D2.2, /(Config_Reg)/(Config_Reg)/, is corrupted, this is regarded as invalid or "false" data. In this embodiment, it is possible to perform the stuffing without output of such invalid data.

A feature of the stuff synchronizers of this embodiment is that in light of the regularity of the running disparity (RD) values, the stuff synchronization is implemented while grouping into a one block those data with the RD values being kept noninverted at the start and tail end thereof.

Figure 15:
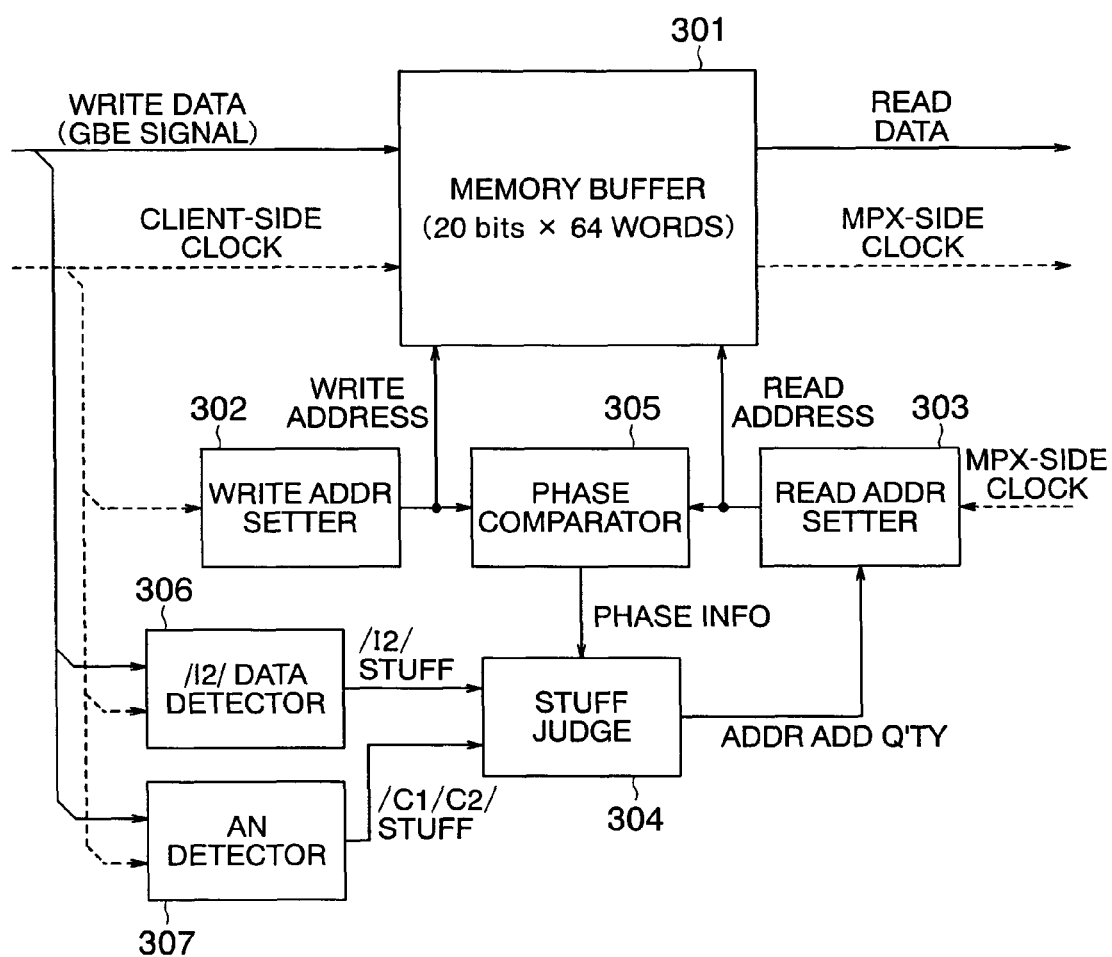
FIG. 15 is a detailed block configuration diagram of a stuff synchronizer unit in the embodiment 1.

A detailed configuration of the stuff synchronizers 31-3n is shown in FIG. 15. The stuff synchronizers 31-3n are each made up of a memory buffer 301 which performs sequential readout of data of Gigabit Ethernet (GbE) signal as received from its corresponding 8B/10B-code synchronizer in the order of data writing, a write address pointing/setting unit 302 which determines a write address when writing data into the memory buffer, a read address setter 303 which determines a read address when reading data out of the memory buffer, a phase comparing unit 305 which monitors a positional relationship of the write address and read address and generates phase comparison information which is passed to a stuffing decision unit 304, an /I2/ data detector 306 which detects an /I2/ pattern and its continuity from the received data and notifies to the stuffing decision unit 304 whether the stuffing is executable or not, an auto-negotiation (AN) detector 307 which detects from the received data a /C1/C2/ pattern and determines the stuffing is executable because of the absence of any Config_Reg transition and then informs it to the stuffing decision unit 304, and the stuffing decision unit 304 which receives the phase comparison information from the phase comparator 305 and the judgment as to whether the /I2/ stuffing is executable or not as sent from the /I2/ data detector 306 plus the decision of whether AN stuffing is possible or not as sent from the AN detector 307 and then determines feasibility of the positive/negative stuffing. Although in this configuration an explanation will be given by exemplifying a specific case where 20 bits (2 codes) are written at a one address in the storage space of the memory buffer 301, the bit number to be stored at such one address should not exclusively be limited to 20 bits, and more or less bits may be stored therein. Additionally, while the description below assumes that the depth of such memory is set at a specific quantity corresponding to 64 words, this is a mere illustrative example. A memory of any depth may be used in a way pursuant to the specifications that respective devices should satisfy.

The write address setter 302 is operatively responsive to receipt of clocks synchronized with the data stream of a GbE signal received, for performing sequential increment by one at a time, thereby causing a write address value to increase one by one. In deference to an instruction from this write address setter 302, the data of received GbE signal is sequentially written into the memory buffer 301.

The read address setter 303 operates with the clocks synchronized with a multiplex signal to perform sequential one-by-one increment under normal conditions and, at the same time, determines a read address value by addition of an address addition quantity from the stuffing decision unit 304 and then reads the data being stored in the memory buffer 301 in accordance with such address value. By changing this address addition quantity of the read address, it performs adaptation or matching of each other's frequency difference to thereby execute synchronization. At the phase comparator 305, this unit compares the positional relationship of the write address as instructed by the write address setter 302 and the read address indicated by the read address setter 303 and then notifies the stuffing decision unit 304 of this position relationship information. This position relation information is the one that indicates a difference between the write address and the read address and is calculable by: (position relation info)= (read address)−(write address).

The /I2/ data detector 306 detects a data pattern of /I2/ from the received GbE signal and determines a timing capable of stuffing a portion of a sequence of /I2/s and then notifies it to the stuffing decision unit 304.

At the AN detector 307, this unit detects a pattern of /C1/C2/ from the received GbE signal and determines whether auto-negotiation is being in process or not. Here, upon detection of continuance of the same /C1/C2/ patterns and detection of the above-stated RD value-noninverted pattern of /C1/C2/C1/C2/, it decides the stuffing is executable and then informs it to the stuff decision unit 304.

Figure 16:
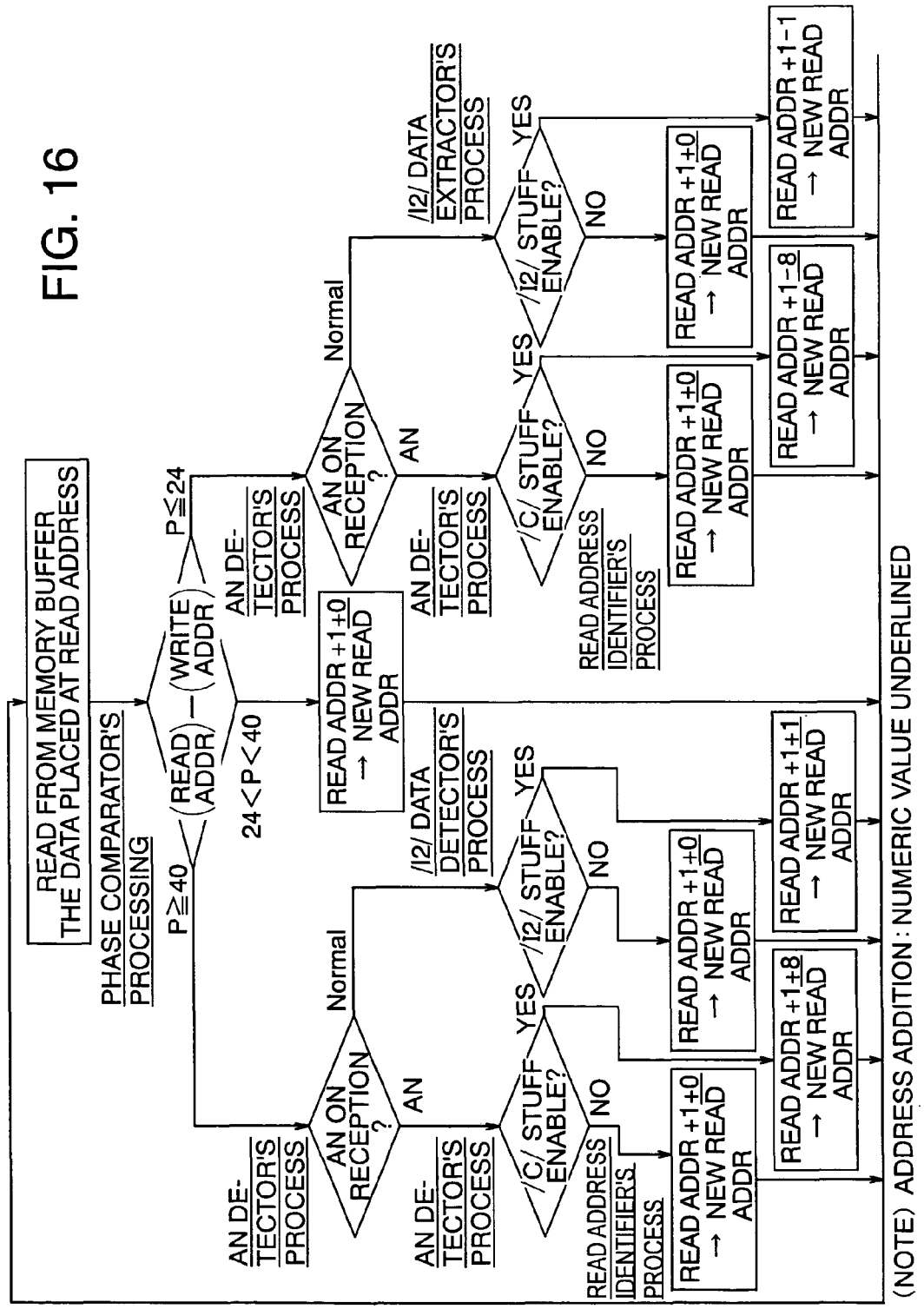
FIG. 16 is a diagram showing a read address control flow in a stuffing determination unit.

The stuff decision unit 304 uses the phase comparison information from the phase comparator 305 and the /I2/ stuffing-enable/disable information from /I2/ data detector 306 plus the /C1/C2/C1/C2/ stiff enable/disable info from AN detector 307 to determine a read address addition quantity in compliance with an address control flow of FIG. 16 and then informs it to the read address setter 303. In responding thereto, this read address setter 303 adds the address addition quantity to the address value that is being incremented in a sequential order and regards its result as the read address. In accordance with this read address, data is sequentially read out of the memory buffer 301.

As previously stated, grouping the total of sixteen codes of /C1/C2/C1/C2/ that flow during auto-negotiation into a single block results in creation of a data stream with RD values kept noninverted at the start and end thereof. In view of this, whenever the positive or negative stuffing is done during auto-negotiation, the read address is varied with sixteen codewords (in this embodiment, 8 addresses because 2 codewords are stored at one address) being as a unit.

When performing the positive or negative stuffing during ordinary frame communications, the stuffing may be done at the timing of /I2/, which is the ordered set with RD values kept noninverted at its start and end. If this is the case, the address is changed with two codes (in this example, one address) being as a unit.

From the foregoing, it is appreciated that it becomes possible, by flexibly controlling the read address in response to the information detected from respective units, to perform the positive or negative stuffing without affecting the RD value continuity not only during normal operations but also during auto-negotiation.

Figure 17:
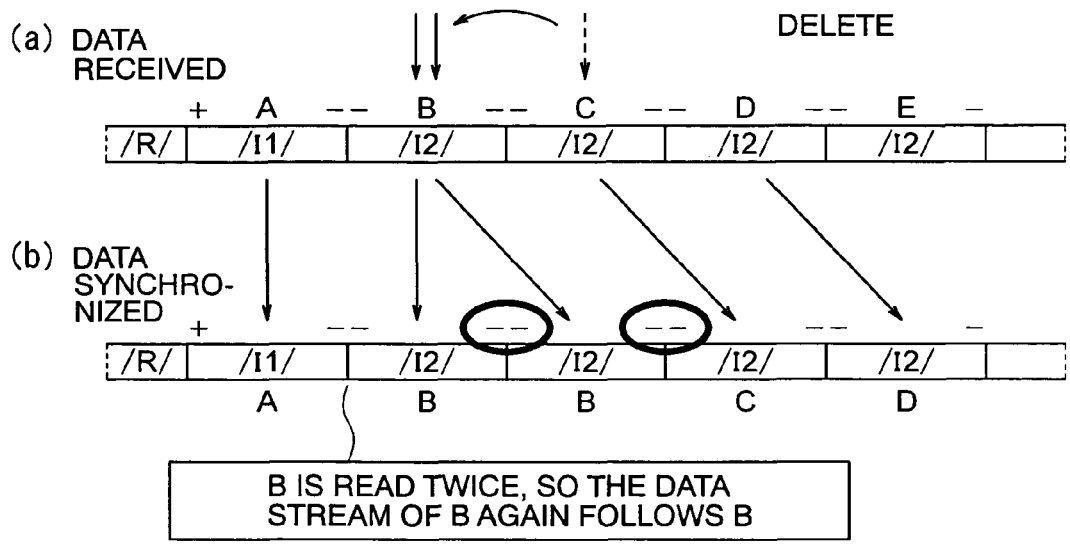
FIG. 17 shows exemplary beam streams of data to be read out in case positive stuffing is performed relative to /I2/.

Below is a detailed explanation as to the behavior of actual readout data at the time the positive or negative stuffing is performed by the read address control of FIG. 16. First shown in FIG. 17 is the behavior in case the positive stuffing is done relative to /I2/. FIG. 17(a) shows a data stream of GbE signal received, wherein data is written into the memory buffer 301 in the order of A→B→C→D, . . . Ordinarily, sequential data write is performed in the order of A→B→C→D . . . in accordance with the address value from the read address setter 303. However, upon receipt of an address addition quantity "−1" from the stuff decision unit 304 after having read the part B, the inherently next-read "C" is not read and, instead, its immediately preceding "B" is read again. This results in that the read data stream becomes A→B→B→C→D . . . , wherein the data stream of "B" is read twice. Looking at the data after synchronization, /I2/ that is a data stream of "B" is inserted (positive stuffing) thereinto. In this event, it takes the form of addition of /I2/ in which RD values are kept noninverted at the start and end of the data. Thus, no influence is given to the RD value continuity.

Figure 18:
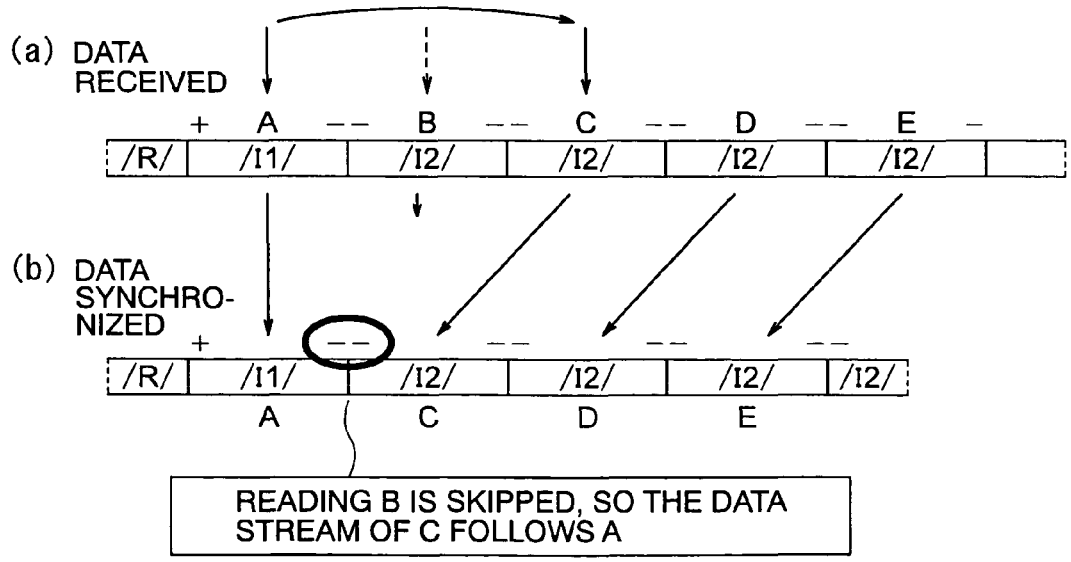
FIG. 18 shows exemplary bit streams of data to be read in case negative stuffing is performed for /I2/.

A behavior when applying negative stuffing to /I2/ is shown in FIG. 18.

Here, upon receipt of an address addition quantity "+1" from the stuff decision unit 304 after readout of the part A, the inherently next-read "B" is failed to be read; instead, its immediately following "C" is read out, resulting in a read data stream becoming A→C→D . . . Looking at the data after synchronization, /I2/ which is a data stream of "B" is not read, causing data drop-out (negative stuffing). In this event, it takes the form of deletion of /I2/ in which RD values are not inverted at its start and end, so no influence is given to the RD value continuity.

Figure 19:
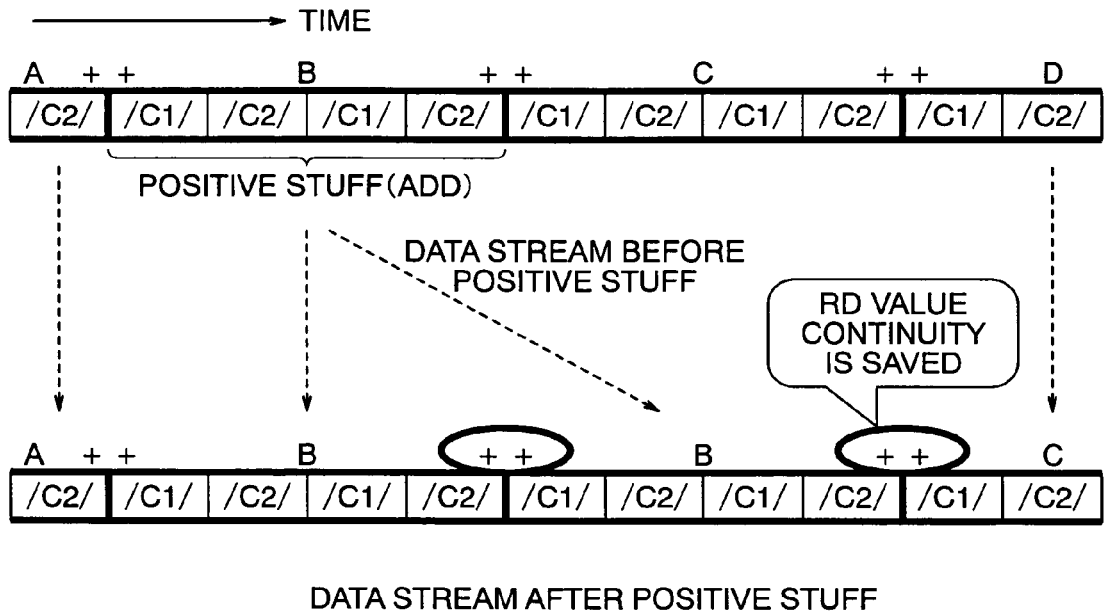
FIG. 19 shows a bit stream of read data in case positive stuffing is performed for /C/.

A behavior when applying positive stuffing to /C/ is shown in FIG. 19.

Shown herein is structures of data before and after synchronization when the condition of the item number 5 of FIG. 21 is met. Upper part of it shows a data stream of a received GbE signal under the assumption that data is written sequentially into the memory buffer 301 in the order of A→B→C→D . . . with /C1/C2/C1/C2/ as a single block. In this state, when the positive stuffing condition is established and if "−8" (=16 codes) is added to the address from the stuff decision unit 304, then the data stream of "B" is again read out, resulting in the read data becoming the order of A→B→B→C→D . . . as shown in lower part of FIG. 19. Looking at the data after synchronization, a data stream of "B" (16 codewords) is inserted between the data stream of "B" and the data stream of "C" (positive stuff) as shown in upper part of FIG. 19. In this event, /C1/C2/C1/C2/ is added per group of 16 codes in which RD values are not inverted at the start and end. Thus, no influence is given to the RD value continuity.

Figure 20:
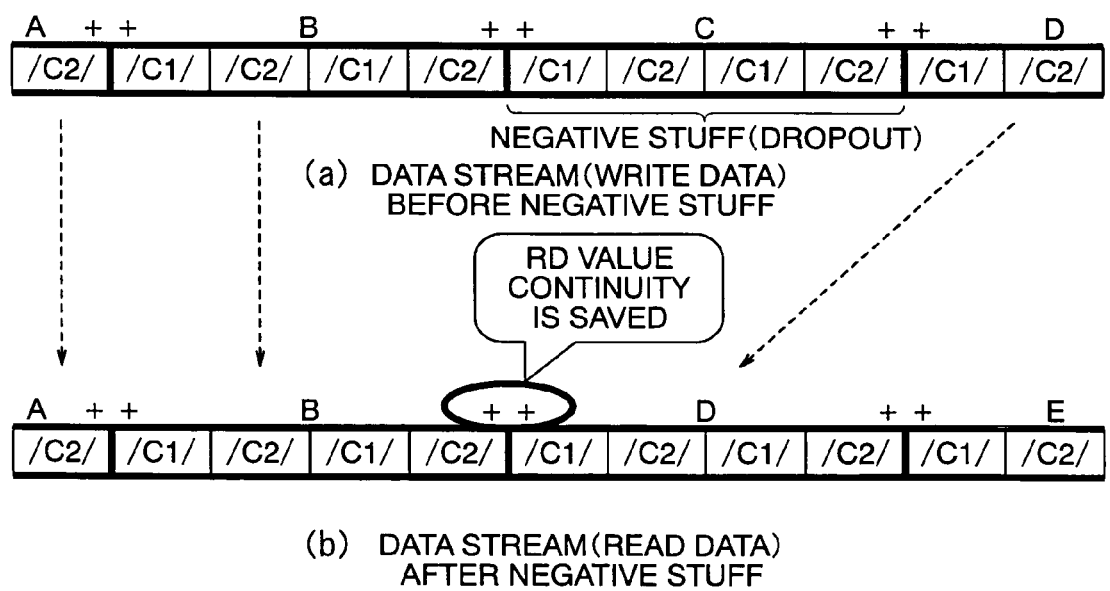
FIG. 20 shows a bit stream of read data when negative stuffing is applied to /C/.

A behavior when applying negative stuffing to /C/ is shown in FIG. 20.

When advancing the read address by +8 (=16 codes), the reading of a data stream of "C" is skipped, resulting in the read data becoming in the order of A→B→D→E . . . as shown in FIG. 20(b). Looking at the data after synchronization, the data stream of "C" in FIG. 20(a) is not read; instead, the data stream of "D" is read after the data stream of "B" with the data stream C being skipped reading (negative stuff). In this event, /C1/C2/C1/C2/ is added per group of 16 codes with RD values being noninverted at the start and end, and thus no influence is given to the RD value continuity.

It should be noted that respective numerical values as stated in this embodiment are not exclusive ones that limit the scope of the invention and may be varied depending on the device specifications on a case-by-case basis. In addition, although in this embodiment the practical stiff amount is set to 16 codes or 2 codes, the RD value continuity is holdable even when performing positive/negative stuffing in units of respective multiple numbers (16×N codes, 2×M codes). This makes the stuff synchronization executable without occurrence of violation against the code rules. Thus, the stuff amount may also be determined with either 16×N codes (where, N is any given natural numbers) or 2×M codes (M is an integer independent of N) being as a unit.

Although the description above is specifically drawn to the stuffing between $f_1$ and $f_0$, similar stuffing is performed also for synchronization between any two of $f_2$ to $f_N$.

The N GbE signals that have been stuff-synchronized with the frequency $f_0$ in the way stated above are input to the port identifier insertion units 31-3$n$, respectively. At here, port identifiers are inserted for the purpose of identifying which one of N GbE signals is input from which port. As will be described later, since N GbE signals are subject to interleave-multiplexing in the order of port 1→port 2→... port N→port 1→..., such port identifier may be inserted with respect to a minimum of one port, although intrinsic identifiers are insertable for all of the ports involved. In this embodiment, an explanation will be given of the case where the insertion is done with respect to a signal of port 1. Port identifier defining is made to /I1/ (=/K28.5/D5.6/), /I2/ (=/K28.5/D16.2/), /C1/ (=/K28.5/D21.5/) and /C2/ (=/K28.5/D2.2/), wherein a port-specific identifier is defined for each ordered set by changing the value of /Da.b/ depending on the port of interest. When changing the /Da.b/ value of an ordered set, any value is employable which is defined in the data (except special symbols) of the IEEE 802.3z code table and which causes the transition states of RD values at the start and end of a code to remain the same before and after the value change to ensure that code-rule violation does not occur. For example, when defining the port identifier for an ordered set with a transition of from "+" to "−," a symbol with a similar transition of "+" →"−" may be used as the port identifier.

Examples of the port identifier are shown in FIG. 21.

At the multiplex processor 100, this unit applies interleave-multiplexing to N port identifier-inserted 8B/10B-encode signals in the order of port 1→port 2→ ... →port N→port 1→ ... to thereby generate a multiplexed signal. Then, the high-rate side multiplex signal transmitter 110 converts the multiplex signal into electrical serial data of 1.25×N Gbps, which is thereafter converted into an optical signal for transmission to a transfer path.

At the high-rate side multiplex signal receiver 120, this unit receives the optical signal of 1.25×N Gbps that was sent to the transfer path, converts it into an electrical signal after extraction of a clock(s) therefrom, and then alters it to parallel data, which is input to the separation processor 130. This processor 130 separates the signal that was interleave-multiplexed at the multiplex processor 100 into N GbE signals, which are input to the port identifier separator 140, respectively. The port identifier separator 140 separates the port identifiers that have been inserted at the port identifier inserter units 31-3$n$ and find the signal that belongs to the port 1 and, at the same time, restores the data that was converted into the port identifier at the port identifier inserters 31-3$n$ in accordance with the procedure shown in FIG. 21. Since it is the data that was interleave-multiplexed in the port order, once the port 1-belonging data is found, the remaining (N−1) GbE signals are determinable to be the signals of the port 2, port 3, ..., port N in this order of sequence. Respective signals are input to the N low-rate side transmission processors 61-6n which belong to the port 1 to port N. These processors 61-6n convert the parallel GbE signals into a serial signal of 1.25 Gbps and then into an optical signal, which is then sent as N GbE signals to a user device(s) being presently linked.

FIG. 22 shows an exemplary data stream which is realized by the GbE multiplex apparatus that is arranged in the way stated above.

First, upper part of FIG. 22 shows a procedure of synchronization at a stuffing synchronizer. Suppose that GbE signals of frequencies $f_1$ to $f_8$ are presently received at the ports 1-8, respectively. If the frequencies $f_1$-$f_8$ are slightly different from one another, then the amount of data to be received within a fixed time period T is different in proportion to such frequency difference. Assume here that the port 1 receives four data of data 1-1 to data 1-4 within the time period T, the port 2 receives three data of data 2-1 to data 2-3 within the period T, and the port 3 receives five data of data 3-1 to data 3-5 within period T. Where it is necessary to send this data at a prespecified frequency, the port 1 in this example is able to transmit the same four data 1-1 to 1-4 within the period T without specific execution of data expansion/contraction. Although the port 2 must send four data 2-1 to 2-4 within the period T, the reality is that this port is merely capable of receiving only three data 2-1 to 2-3, wherein a certain fixed data (e.g., ordered set /I/ or /C/ in this embodiment) is inserted into a portion at which data 2-4 must have inherently been sent (positive stuffing). At the port 3, only four data 3-1 to 3-4 are sendable within the period T; however, ex facto, it has already received five data 3-1 to 3-5 so that adjustment is made to delete the data 3-4 (negative stuffing) and send four data of data 3-1 to 3-3 and data 3-5. Since the processing for adding or deleting data in this way is performed with respect to /I/ (idle ordered set) indicative of a null signal period and /C/ (configuration ordered set) with contiguous data being transmitted as stated previously, it is virtually seen that the null signal period and the contiguous data stream becomes longer or shorter; however, in reality, the data synchronization is attainable without affecting MAC frames. Additionally, while the continuity of RD values in 8B/10B codes must also be guaranteed, it is possible, by performing the processing using the stuff synchronizer 304 shown in FIG. 15 in accordance with the read address control flow of FIG. 16, to enable addition/removal of data (positive or negative stuffing) while assuring the RD value continuity.

Next, lower part of FIG. 22 shows the appearance of a data stream during multiplexing at the multiplex processor. The data that was synchronized by the prior synchronization processing is input to the multiplex processor 110, which applies thereto interleave-multiplexing in the order of port 1→port 2 →port 3→ ... →port 8→port 1→port 2 → ....

In this way, the synchronization and the multiplex separation are performed while keeping 8B/10B code intact without affecting 8,B/10B code rules, such as the RD value continuity, to thereby achieve the full transparency of MAC frames, including 8B/10B code-defined ordered sets, preambles and start frame delimiters (SFDs).

Figure 24:
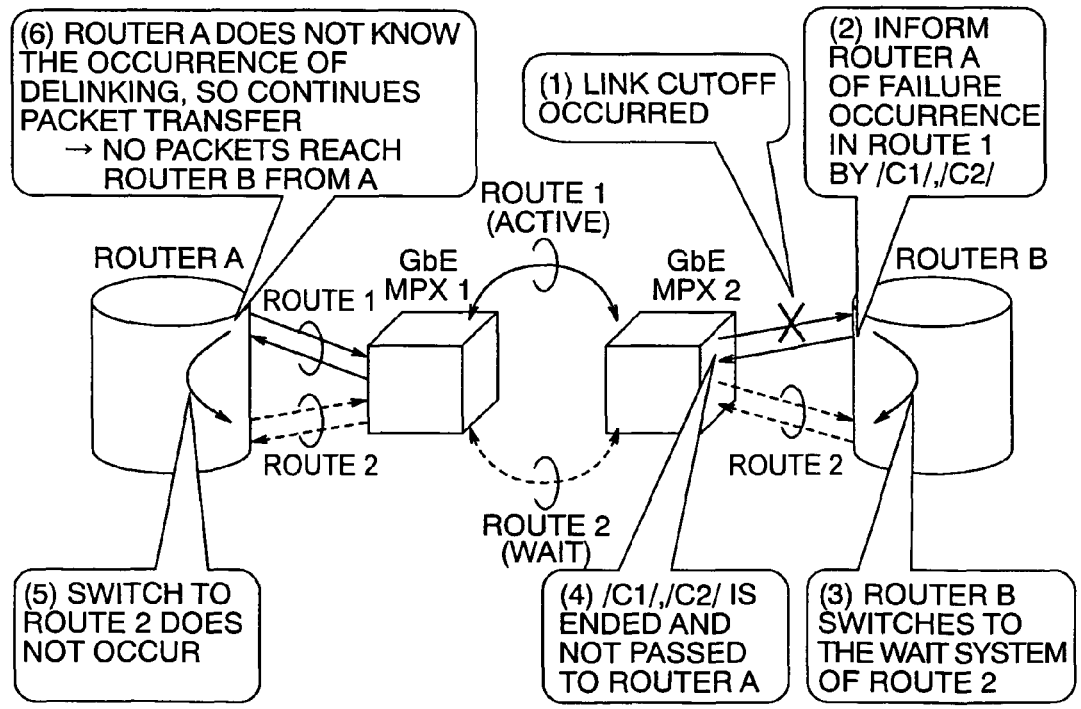
FIG. 24 is a diagram showing a problematic behavior in the case of applying prior art Gigabit Ethernet multiplexing devices.

FIG. 24 depicts an exemplary configuration of a network employing Gigabit Ethernet (GbE) multiplexing devices.

In a case where GbE multiplexing devices are connected between routers A and B so that /C1/, /C2/ is terminated thereat, when a link in the direction of GbE multiplex device 2→router B is cut off, the router B is able to instantly become aware of such link-off in the direction of GbE multiplexer 2→router B, so it switches the router B's sending packets to a route 2 which is in a wait mode. On the other hand, although the router B uses /C1/, /C2/ to notify the router A of the fact that the link is cut off in the direction of router A→router B, this information does not reach a switch A because the GbE multiplexer 2 attempts to terminate /C1/, /C2/. In this event, the switch A merely operates to continue sending the packets to the direction of a route 1. As the link in the direction of router A→router B has already been cut off, the router A recognizes obstruction in another layer. This results in continuous generation of packet loss until completion of the switching of transmission direction to the route 2, which can seriously affect the service.

Figure 23:
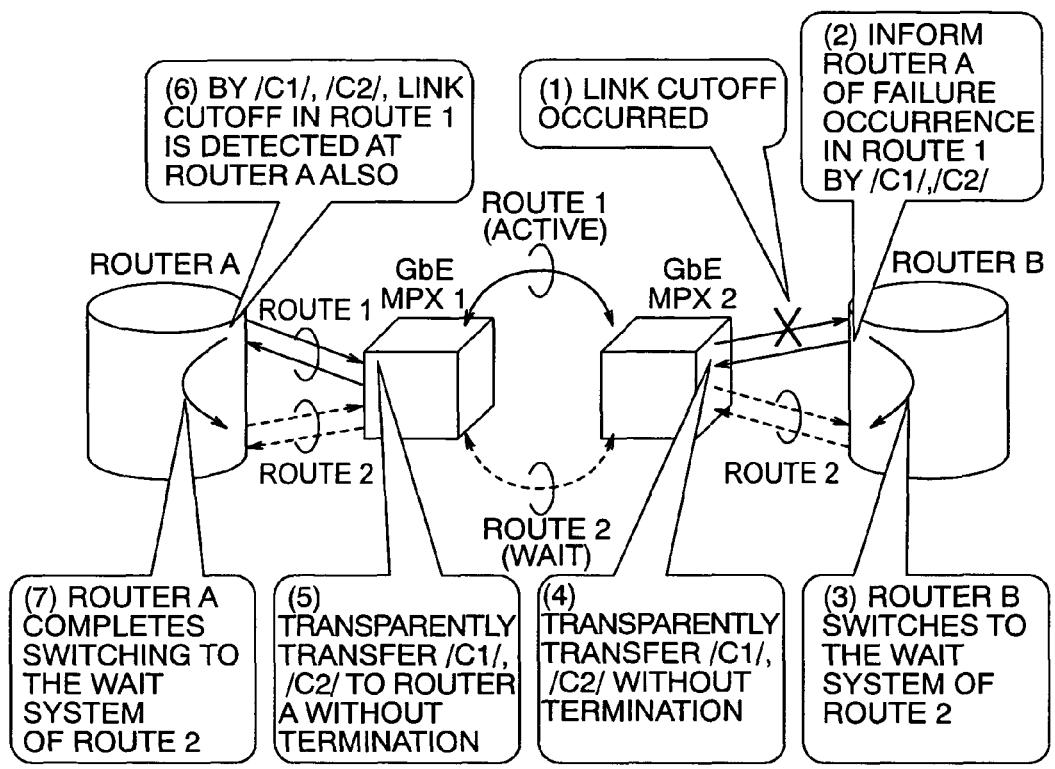
FIG. 23 is a diagram showing an effect of this invention in the embodiment 1.

FIG. 23 is a diagram for explanation of effects of a network configuration which employs GbE multiplexing devices embodying this invention.

In case the GbE multiplexer devices embodying the present embodiment are applied between the routers A and B, none of these devices terminate 8B/10B code so that the ordered set which is defined only for 8B/10B code, such as /C1/ or /C2/ to be sent by the router A, is transparently transferred up to the router B. Upon cutoff of a link in the direction of GbE multiplexer 2 →router B, the switch B is able to promptly acknowledge the cutoff of the link in such direction and then switches the packet(s) being sent by the router B to the route 2 that is in the wait mode. Meanwhile, the router B uses /C1/, /C2/ to inform the router A of the fact that the link in the direction of router A→router B was cut off. This information is forwarded to the router A since the GbE multiplexer 2 does not terminate /C1/, /C2/ and permits transparent transmission of it toward the router A. Thus the router A is capable of knowing that the link of router A→B which is its own transmission direction was cut off. The router A also performs quickly the switching of its packet sending direction from the route 1 to route 2, thereby enabling recovery of a bidirectional communications line.

Figure 25:
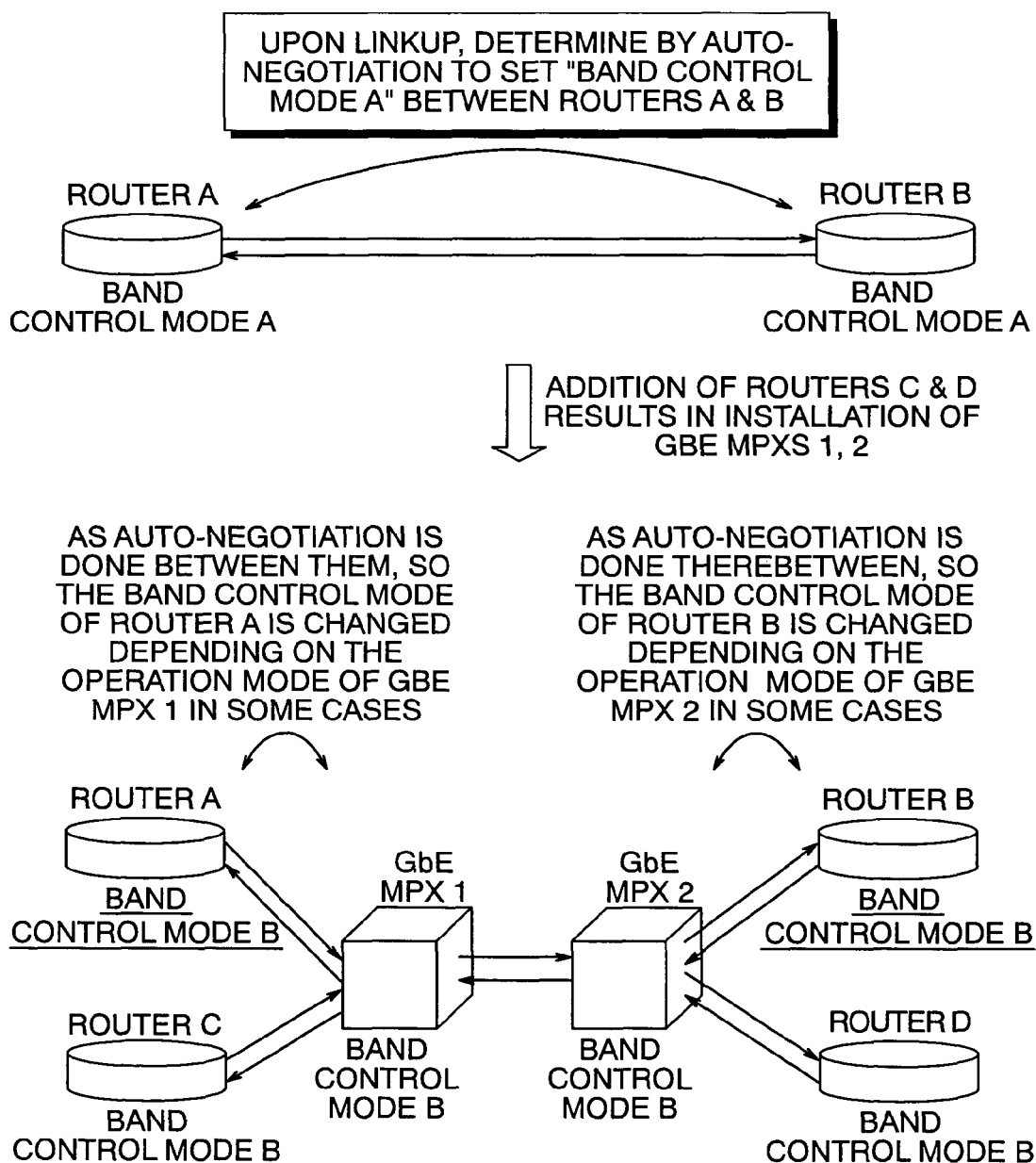
FIG. 25 shows the behavior relating to a band control mode in the case of using prior art Gigabit Ethernet multiplexing devices.

FIG. 25 depicts the influence on a band control mode in the case of installation of prior art GbE multiplexing devices.

MAC-terminating devices, such as routers, are typically designed to have a function of controlling a transmit frame amount in a way pursuant to the load status of a network to thereby retain the balance of such network load. This is called the band control. During auto-negotiation, each other's operation mode is exchanged so that an optimal operation mode of this band control is also determined. In case routers A and B are directly connected to each other as shown in FIG. 25, auto-negotiation is performed between the routers A and B. It is thus possible to directly exchange each other's operation mode therebetween, resulting in both of these routers A-B operating in a "band control mode A." In this state, when prior art GbE multiplexer devices 1 and 2 are installed due to additional installation of routers C and D, the auto-negotiation is independently performed between the router A and GbE multiplexer 1 and between the router B and GbE multiplexer 2. Thus it is no longer possible to exchange the operation mode between the routers A and B. Although the band control mode should inherently be determined between MAC frame-terminating devices (in this case, the router A and router B), this would result in that the operation modes of the routers A and B are determined depending on the operation modes of the GbE multiplexers 1 and 2 whereby there is a risk that the band control mode of routers A-B changes to another mode before and after the installation of the GbE multiplexers 1-2. Such mode change can sometimes affect the network.

On the contrary, in the case of installing the GbE multiplexer devices embodying the invention as shown in FIG. 26, auto-negotiation is performed between the routers A and B even after the installation of these GbE multiplexers in a similar way to that prior to the installation thereof. Thus it is possible to directly exchange the operation modes between the routers A and B. The band control mode is also determined by the exchange between the routers A-B. Thus, it hardly happens that the band control mode changes between before and after the installation of the GbE multiplexers 1 and 2. This makes it possible to permit application of GbE multiplexer devices without bothering the influence on the existing network due to the installation thereof.

As the GbE multiplexer device embodying the invention offers its ability to transparently transfer 8B/10B codes while keeping them intact, it becomes possible to avoid the problems stated above. Although in this embodiment specific information to be contained in /C1/, /C2/ is taken as an example, this is not the one that limits the invention. In the existing networks configured from those devices which realize their unique functions by use of any one of 8B/10B codes such as /C1/, /C2/ or else in IEEE Std 802.3z and the information defined in ordered sets plus 8B/10B codes, in every case of accommodation using the GbE multiplexing device(s) incorporating the principles of this invention, it is possible to install them in the same way without affecting the existing network while obtaining similar effects.

Embodiment 2

Figure 27:
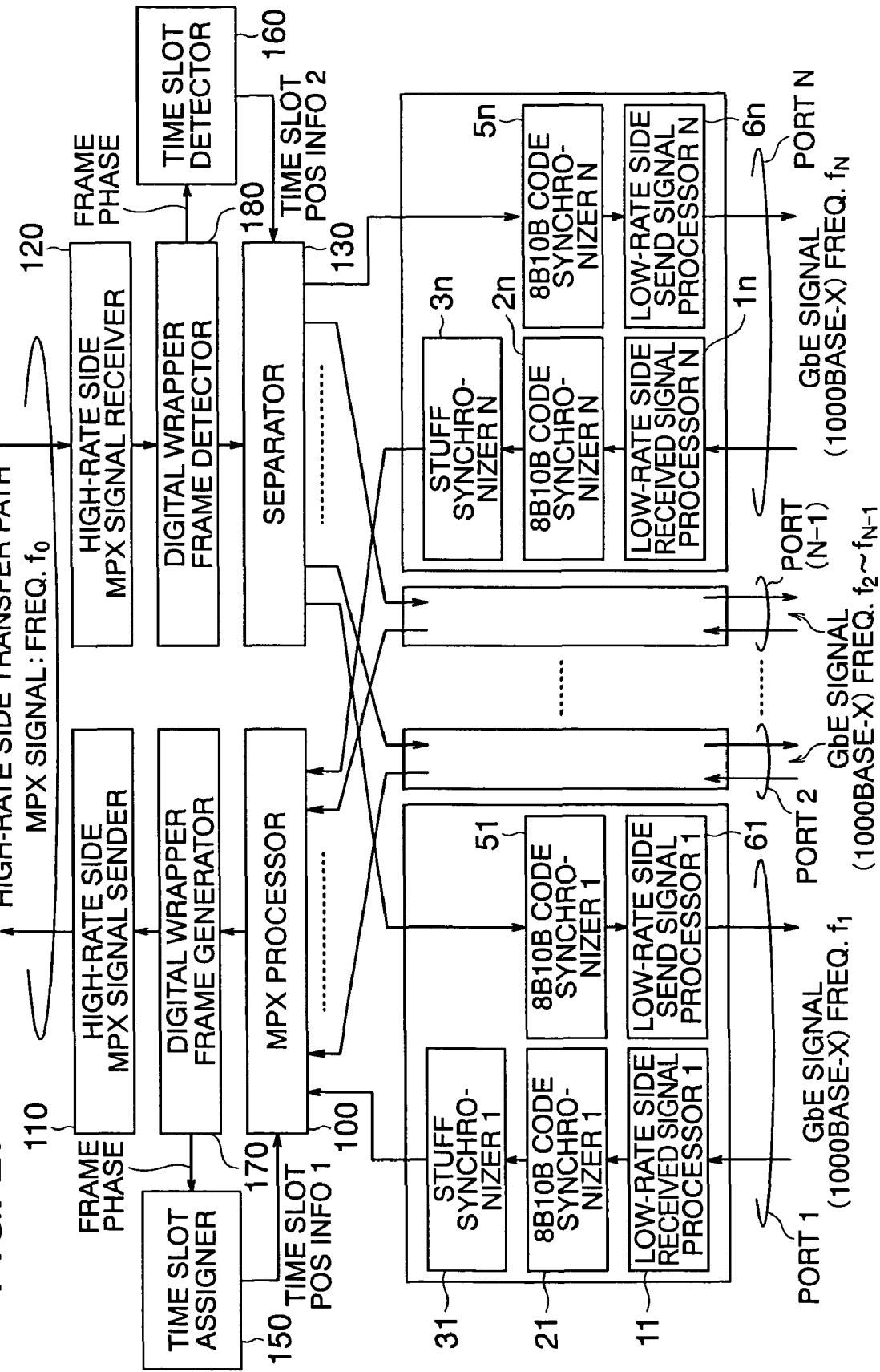
FIG. 27 is a diagram showing a configuration of a Gigabit Ethernet multiplexing device in accordance with an embodiment 2 of the invention.

Fixed assign of time slot (no port identifiers are necessary).
Turning to FIG. 27, a configuration of a Gigabit Ethernet (GbE) multiplexing apparatus in accordance with a second embodiment of this invention is illustrated in block diagram form.

This embodiment is characterized by having, in place of the port identifier inserters 31-3n and port identifier separator 140, a time slot assigning unit 150 and a time slot detection unit 160 along with a digital wrapper frame generator unit 170 and a digital wrapper frame detector unit 180, thereby to fixedly assign a location (time slot) at which the data of each port is mapped with respect to the phase of a frame of digital wrapper having a fixed length frame. Regarding the other arrangements, this embodiment is the same as the embodiment 1.

Although the description here assumes that an optical transport network (OTN) frame which is defined in ITU-T Recommendation G.709 is used as an example of the digital wrapper having a fixed length frame, this digital wrapper should not exclusively be limited to the OTN frame, and any other frames are also employable as far as these have a fixed length frame.

In the block diagram of this embodiment of FIG. 27, the GbE multiplexing device embodying the invention is generally made up of a predetermined number, N, of low-rate side received signal processing units 11 to in which receive N 8B/10B-encoded GbE signals and convert them into electrical signals after extraction of a clock(s) and then expand them to parallel data, N 8B/10B code synchronizing units 21-2n which independently detect an 8B/10B code synchronization pattern relative to a respective one of the N GbE signals that have been converted into the electrical signals and perform data sort processing, stuff synchronizer units 31-3n for synchronizing N GbE signals that differ in frequency from one another in a range of +/−100 ppm in maximum into a single specific frequency $f_0$, a time slot assignment unit 150 which instructs which one of N signals that are synchronized with the frame phase of OTN frame is mapped to which one of time slots, a multiplex processing unit 100 which performs interleaved-multiplexing of N synchronized signals in deference to the instruction from the time slot assigner 150 to thereby generate a multiplexed signal, a digital wrapper frame generator unit 170 for mapping the multiplexed signal into an OTN frame(s), a high-rate side multiplex signal transmitter unit 110 which converts this OTN frame into serial data and then into an optical signal, a high-rate side multiplex signal receiver unit 120 which receives the OTN frame that was converted to the optical signal, extracts a clock(s) therefrom, converts it to an electrical signal, and expands it to parallel data, a digital wrapper frame detector unit 180 which extracts the multiplex signal from the OTN frame that has been parallel expanded, a time slot detector unit 160 which notifies which one of N GbE signals of 1 to N is mapped to which time slot of the OTN frame, a separation processing unit 130 which separates the multiplex signal that was extracted from OTN frame into N GbE signals based on the time slot information as notified from the time slot detector 160 and then performs distribution to respective ports, N 8B/10B-code synchronizer units 41-4n which detect an 8B/10B code synchronization pattern independently of a respective one of the separated N GbE signals and then perform data sorting, and low-rate side send signal processing units 51 to 5n for converting the separated GbE signals into a serial signal of 1.25 Gbps and then into an optical signal and for sending it to a presently linked user device(s) in the form of N GbE signals.

Figure 28:
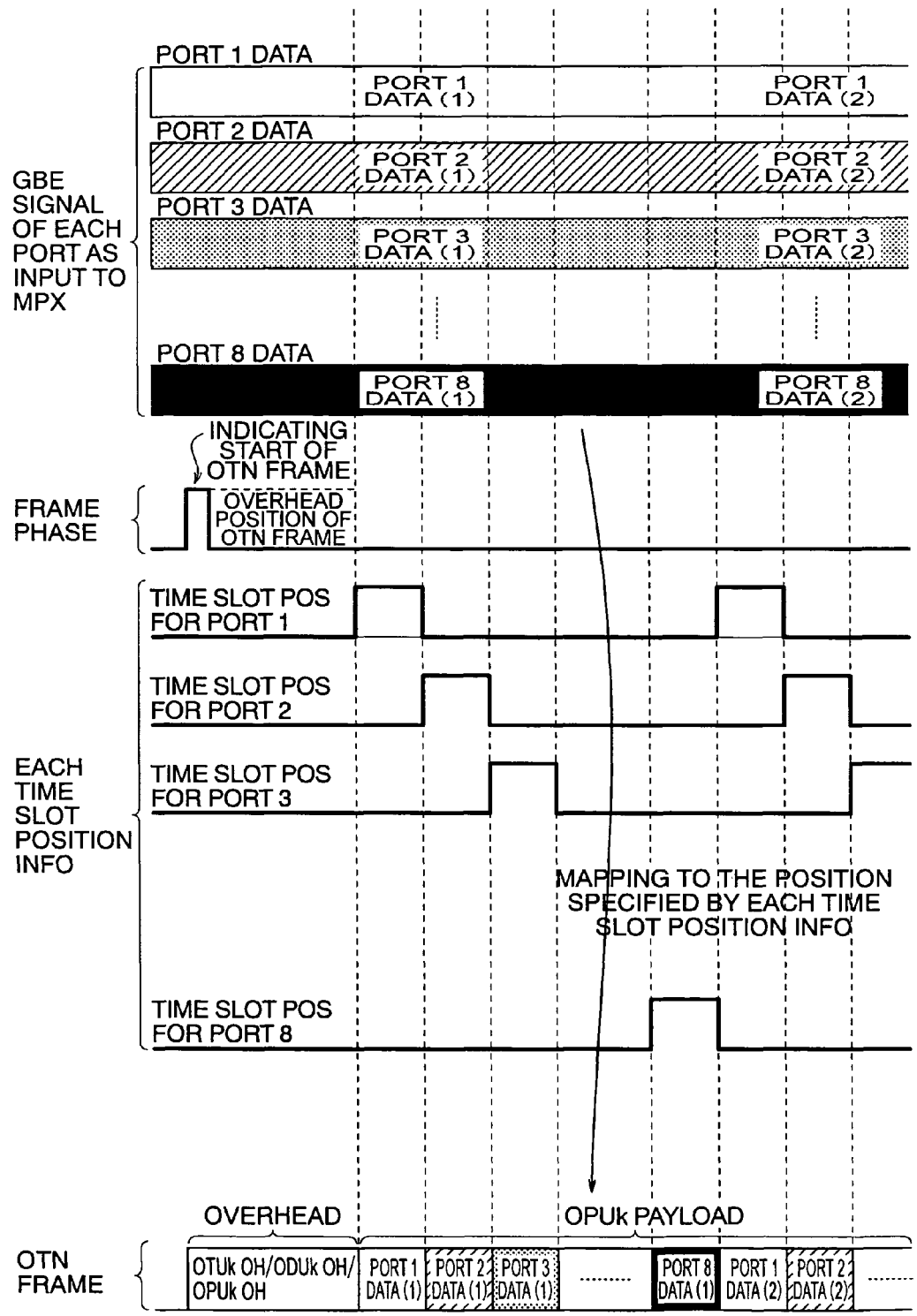
FIG. 28 is a diagram showing a process of assigning a time slot to OTN frame and mapping a plurality of Gigabit Ether signals into OTN frame.

A practical procedure unique to this embodiment is shown in FIG. 28, which is performed at the digital wrapper frame generator 170, the time slot assigner 150 and the multiplex processor 100. Here, an explanation will be given of a case where eight GbE signals are multiplexed for mapping into an OTN frame.

The eight GbE signals that are stuff-synchronized at the stuff synchronizers 31-3n of FIG. 27 are input in a parallel way to the multiplex processor 100 as shown in FIG. 28. Meanwhile, the digital wrapper frame generator 170 sends to the time slot assigner 150 a "frame phase" indicative of the start position of OTN frame. The time slot assigner 150 which received this frame phase operates to equally assign the data of eight GbE signals to data storage areas (OPUk payloads) other than the overhead field of OTN frame and determines a to-be-mapped position (time slot position) of each port. Importantly, the frame phase indicating the start of OTN frame is used as a reference to determine the time slot position in the order of port 1→port 2→port 3→ . . . →port 8→port 1→port 2→ . . . . By doing so, it becomes possible, when using the frame phase as the reference, to recognize that the data received at each port belongs to exactly which one of the ports. Accordingly, unlike the embodiment 1, it is no longer necessary to perform the processing for addition/deletion of the port identifier that was inserted in order to identify which port issues the data of interest. The time slot position of each port determined by the time slot assigner 150 is passed from this unit 150 to the multiplex processor 100 as each time slot position information 1. The multiplex processor 100 maps the data of N GbE signals that are received from the stuff synchronizers 31-3n at the timing of the time slot position information notified from the time slot assigner 150 into OTN frame's OPUk payload while keeping 8B/10B code intact and then sends the mapped data to the digital wrapper frame generator 170. The digital wrapper frame generator 170 adds to the received data a variety of overheads as defined in ITU-T Rec. G.709, thereby generating a single OTN frame with eight GbE signals being mapped into OPUk payload.

This OTN frame generated is converted by the high-rate multiplex signal transmitter 110 from the parallel data into a serial electrical signal, which is then converted to an optical signal for transmission. At the high-rate multiplex signal receiver 120, this unit converts the received optical signal into an electrical signal and then expands it to parallel data, which will be forwarded to the digital wrapper frame detector 180.

Figure 29:
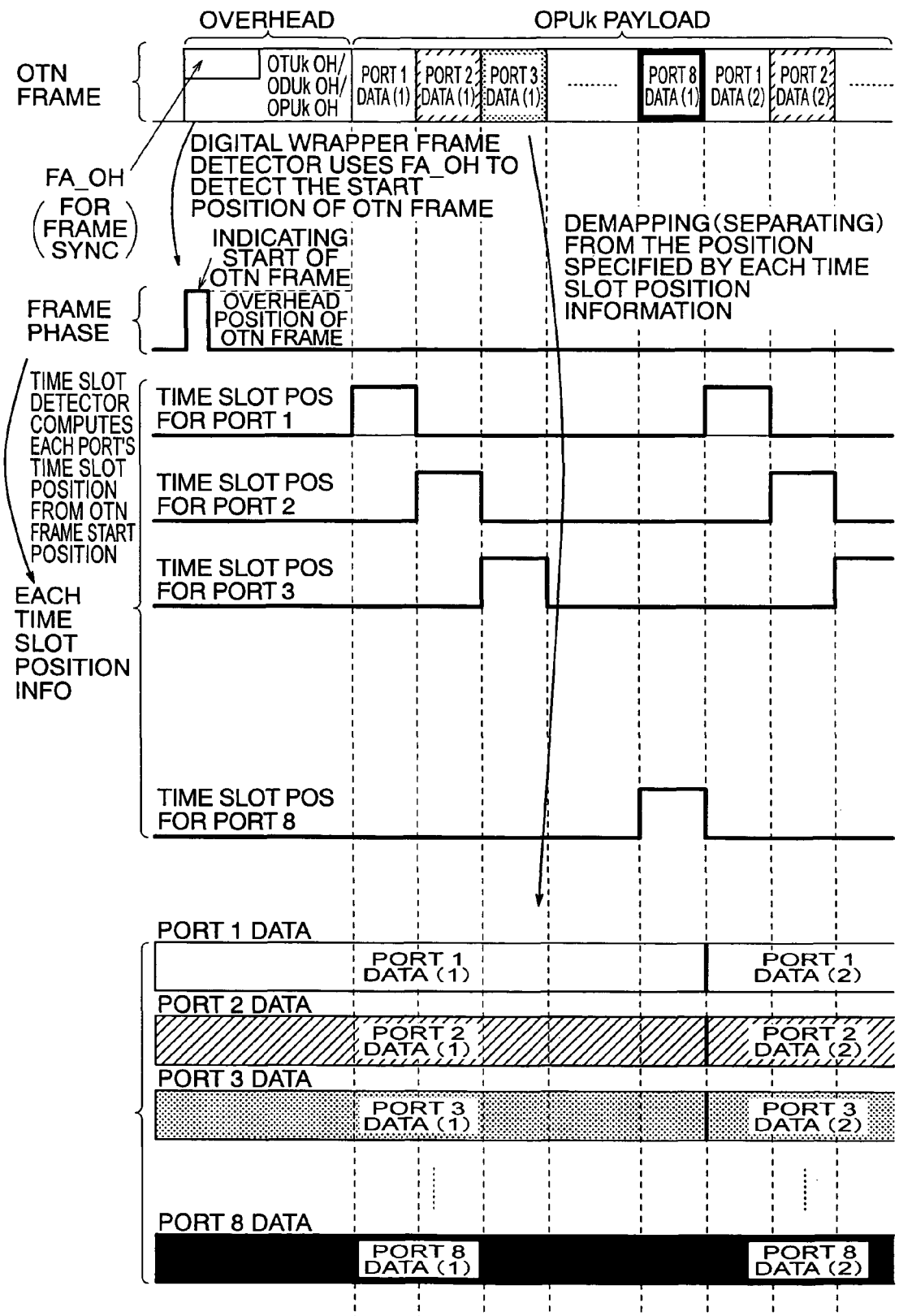
FIG. 29 is a diagram showing a way of assigning a time slot to OTN frame and demapping a plurality of Gigabit Ether signals from OTN frame.

A practically implemented procedure is shown in FIG. 29, which is performed by the digital wrapper frame detector 180 and time slot detector 160 plus separation processor 130.

Upon receipt of the data, the digital wrapper frame detector 180 detects a sync pattern of FA_OH that is defined as a byte for frame synchronization in order to detect the start of an OTN frame and recognizes the top position of OTN frame and then sends forth a frame phase signal toward the time slot detector 160. If the start position of OTN frame is recognizable then separate the overhead added by the digital wrapper frame generator 170 and thereafter extract from OTN frame the OPUk payload in which eight GbE signal are mapped thereinto for transmission to the separation processor 130.

Meanwhile, the time slot detector 160 performs back-calculation from the frame phase indicating the start position of OTN frame that was received from the digital wrapper frame detector 180 and detects a time slot position at which eight GbE signals must have been mapped and then notifies the separation processor 130 of "time slot information 2" indicative of the time slot position. The separation processor 130 is able to recognize the position of OPUk payload-mapped GbE signal of each port from the OPUk payload data taken out of the OTN frame and the time slot information 2 that was informed from the time slot detector 160, and separates it into eight GbE signals in deference to such information.

As apparent from the foregoing, in this embodiment, it is possible, by performing mapping/demapping of N GbE signals into a digital wrapper having a fixed length frame while keeping 8B/10B code intact and fixedly assigning the time slot of each signal at a position corresponding to the frame phase of the digital wrapper, to identify the position at which each GbE signal is mapped, thereby eliminating the need to perform the processing for inserting and extracting the port identifier which is to identify that each data belongs to the data of which one of the ports with respect to the data field of /I/ or /C/ of GbE signal as used in the embodiment 1. The embodiment discussed herein is featured in that the port identifiers used in the embodiment 1 are no longer required by notifying the per-port "time slot information" to the multiplex processor 100 and separation processor 130 and allowing these processors to perform the multiplex separation processing in deference to the information. While in the embodiment 1 the data of /I/ or /C/ is modified in order to identify that each data belongs to the data of which port, this embodiment 2 employs its unique scheme for mapping into the digital wrapper with a fixed length frame configuration while letting the data of /I/ or /C/ be kept unprocessed and, thus, provides a method capable of permitting passage of the data used as the port identifier in the embodiment 1 in addition to 8B/10B codes.

Although in this embodiment the mapping order to be determined at the time slot assigner 150 and/or the time slot detector 160 is set to a sequence of port →port 2→port 3→ . . . →port n→port 1→port 2 → . . . from the start position of OTN frame, this setting does not intend to limit the mapping order to this sequence only. Any other possible mapping/demapping orders are settable as far as the rules are identical both in the multiplexing direction and in the separation direction.

According to this invention, it becomes possible even after the installation of GbE multiplexing apparatus to directly perform auto-negotiations in a similar way to that when routers have been directly linked together by a fiber-optic cable. It is also possible to provide a transparent GbE multiplexer apparatus which permits intact pass-through of the preamble and SFD that are parts of MAC frame.

Also note that the multiplex separation is performed while saving 8B/10B codes used in GbE signals so that not only MAC frames but also operation modes of respective devices and obstruction information being exchanged during auto-negotiation are transparently passed to a user device(s) at the opposite end of a communications link. Use of such multiplexing scheme realizes a virtually transparent network which is seen as if each of more than two GbE signals was individually direct-coupled by its own fiber-optic cable in a logical sense, irrespective of the fact that these are physically connected together by a single fiber-optic cable. The GbE multiplexer device of this invention is capable of directly exchanging information between user devices with respect to the 8B/10B code-defined configuration ordered set also in a traditional way even when this GbE MPX device resides between respective devices that handle GbE signals, such as routers, and thus makes it possible to determine via direct exchange the optimum operation mode between the user devices after having installed the GbE MPX device, thereby offering an advantage as to an ability to bidirectionally switch between the user devices even upon occurrence of obstructions.

Further note that in recent years, due to differences in operation specifications per vendor or parts manufacturer and/or in complicated processing sequence, an attempt to connect to an apparatus of a heterogeneous vendor often encounters the occurrence of a case where the auto-negotiation fails to be completed successfully, resulting in failure of linkup. The GbE multiplexer device of this invention permits penetration without terminating 8B/10B code and enables the auto-negotiation processing after having installed the GbE multiplexer also to become the exchange between user devices. Thus it becomes possible to multiplex GbE signal and efficiently accommodate it without affecting the auto-negotiation sequence between the existing user devices.

In recent years, the demand for GbE communications lines grows rapidly, and the need for GbE time-division multiplex (TDM) apparatus increases appreciably. However, the use of prior art GbE multiplex devices suffers from the incapability of transparently transporting the maintenance information between user devices, resulting in an increase in workload as to operation and maintenance services. In view of this, it is believed that this invention which solved this problem is noticeably high in utility value.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A transmission apparatus for receiving a plurality of encoded user signals and for multiplexing the plurality of encoded user signals to thereby convert these signals into a single multiplexed signal, said apparatus comprising:
a multiplexer performing multiplexing without altering contents including codes of the plurality of encoded user signals, and for sending the resulting multiplexed signal to a transmission path;
a receiver receiving a multiplexed signal from another transmission apparatus via such multiplexed signal's associated transmission path and for separating the multiplexed signal into a plurality of encoded user signals without changing code contents of the multiplexed signal; and
a synchronization processor performing synchronization processing with a block, which consists only of contiguous and adjacent ordered sets /C/, running disparity value is kept noninverted at a start and an end, by insertion or deletion of said block with respect to said code in detecting that an auto-negotiation ordered set is included in the plurality of encoded user signals and that the auto-negotiation ordered set has a data pattern whose running disparity value is kept noninverted at an start and an end, wherein said code is an 8B/10B code and /C/ is defined by the 8B/10B code, and wherein the received signal is an Ethernet signal.

2. The transmission apparatus according to claim 1, wherein said synchronization processor performing synchronization processing includes an extractor extracting data of 8B/10B code, a checker unit checking whether the extracted data is an ordered set /C/ or /I/ as defined by the 8B/10B code, a writer/reader writing and reading a received user signal into and from a buffer memory without decoding it into the 8B/10B code, a comparator comparing a read address with a write address and for adjusting a next read address position when an address difference between said read address and said write address is in excess of or below a predefined threshold level, and a read address determiner determining, when a need arises to adjust the read address position, the read address position from said address difference and a check result of said received data without loosing continuity of Running Disparity of the 8B/10B code.

3. The transmission apparatus according to claim 1 or 2, further comprising:
an extractor extracting 8B/10B code data from each of the plurality of received signals made up of 8B/10B codes and for performing, when inserting or deleting data with respect to a stream of received data during execution of stuff synchronization in order to absorb a rate difference between input and output data, stuffing-based synchronization without generating and delivering abusive data violating rules of the 8B/10B code or the continuity thereof.

4. The transmission apparatus according to claim 1 or 2, further comprising:
an extractor extracting 8B/10B code data from a plurality of received signals made up of 8B/10B codes respectively, and for determining from the extracted data that an identical ordered set is continuously received within a predetermined length of time period; and
a synchronization processor determining, upon insertion or deletion of data with respect to a received data stream during execution of stuff synchronization, data without inversion of a Running Disparity value of 8B/10B code before and after the data to be inserted or deleted, thereby to perform stuff synchronization without damaging every information contained in the 8B/10B code.

5. The transmission apparatus according to claim 1, wherein said apparatus further comprises:
a converter converting data other than a code containing a comma pattern making up an ordered set into another value without terminating the 8B/10B code with respect to a plurality of received signal configured from 8B/10B codes;
a detector detecting said changed value after separation of a multiplexed transferred signal, and for identifying a port to which the separated data belongs;
an outputter outputting the separated signal to each port based on the identification information; and
a demultiplexer enabling recovery of said changed value to its original value.

6. The transmission apparatus according to claim 1, wherein said apparatus further comprises:
a multiplexer uniquely determining, with respect to a plurality of received signals made up of 8B/10B codes, an area to be mapped in units of said plurality of received signals with a start of a frame within a fixed length frame being as a reference without terminating the 8B/10B code;

a multiplexer mapping said plurality of signals made up of the 8B/10B codes respectively into this determined area respectively without altering contents of such data;

a demultiplexer receiving a multiplexed signal configured from a fixed length frame with the plurality of 8B/10B code-configured signals being accommodated therein and for detecting a start position of the fixed length frame;

a demultiplexer separating, from the fixed length frame, such plurality of signals respectively from an area with said plurality of 8B/10B code-configured signals being stored therein;

a demultiplexer identifying, based on a relative positional relationship between the start position of the detected fixed length frame and a position at which the separated data have been mapped, a port to which a respective one of the separated data belongs without adding any modification to the plurality of 8B/10B code-configured signals; and an outputter outputting, based on the identified information, a plurality of separated 8B/10B code-configured signals to respective ports.

7. The transmission apparatus according to claim 6, wherein the fixed length frame for mapping the plurality of 8B/10B code-configured signals is an optical transport network (OTN) frame.

8. The transmission apparatus according to claim 6, wherein the fixed length frame for mapping the plurality of 8B/10B code-configured signals is a synchronous digital hierarchy (SDH) frame.

9. The transmission apparatus according to claim 6, wherein the fixed length frame for mapping the plurality of 8B/10B code-configured signals is a synchronous optical network (SONET) frame.

10. The transmission apparatus according to claim 1 or 2, wherein the 8B/10B code-configured signal is a signal of 1000BASE-X.

11. The transmission apparatus according to claim 1, wherein the /C/ contains a data indicative of an operation mode.

12. The transmission apparatus according to claim 1, wherein the /C/ contains a data indicative of an operation mode which is exchanged between client devices.

13. The transmission apparatus according to claim 1, wherein the auto-negotiation ordered set is according to the 8B/10B code in IEEE802.3Z.

* * * * *